(12) United States Patent
Wijaya

(10) Patent No.: US 10,658,826 B2
(45) Date of Patent: *May 19, 2020

(54) ELECTRICAL DEVICE PROTECTIVE HOUSING

(71) Applicant: TITAN3 TECHNOLOGY LLC, Tempe, AZ (US)

(72) Inventor: Agustinus Wijaya, Tempe, AZ (US)

(73) Assignee: TITAN3 TECHNOLOGY LLC, Tempe, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/416,941

(22) Filed: May 20, 2019

(65) Prior Publication Data

US 2019/0319439 A1 Oct. 17, 2019

Related U.S. Application Data

(60) Continuation of application No. 15/137,992, filed on Apr. 25, 2016, now Pat. No. 10,340,676, which is a division of application No. 14/679,919, filed on Apr. 6, 2015, now Pat. No. 9,680,292.

(60) Provisional application No. 61/975,943, filed on Apr. 7, 2014.

(51) Int. Cl.
| | | |
|---|---|---|
| H02G 3/18 | (2006.01) | |
| H02G 3/14 | (2006.01) | |
| H02G 3/08 | (2006.01) | |
| H02B 1/38 | (2006.01) | |

(52) U.S. Cl.
CPC ............... *H02G 3/14* (2013.01); *H02G 3/081* (2013.01); *H02G 3/085* (2013.01); *H02B 1/38* (2013.01); *H02G 3/088* (2013.01); *H02G 3/18* (2013.01); *Y10T 29/49002* (2015.01)

(58) Field of Classification Search
None
See application file for complete search history.

(56) References Cited

U.S. PATENT DOCUMENTS

| | | |
|---|---|---|
| 5,280,135 A | 1/1994 | Berlin |
| 5,763,831 A | 6/1998 | Shotey |
| 5,981,875 A | 11/1999 | Kesler |
| 6,891,104 B2 | 5/2005 | Dinh |
| 7,235,740 B2 | 6/2007 | Dinh |
| 7,241,952 B2 | 7/2007 | Dinh |
| 7,323,639 B1 | 1/2008 | Shotey |
| 7,368,662 B1 | 5/2008 | Shotey |
| 7,396,997 B2 | 7/2008 | Dinh |
| 7,439,444 B1 | 10/2008 | Maltby |
| 7,462,777 B2 | 12/2008 | Dinh |
| 7,598,453 B1 | 10/2009 | Shotey |
| 7,619,162 B2 | 11/2009 | Dinh |
| 7,728,226 B2 | 6/2010 | Drane |
| 7,763,798 B1 | 7/2010 | Shotey |
| 8,153,985 B2 | 4/2012 | Drane |

(Continued)

*Primary Examiner* — Dimary S Lopez Cruz
(74) *Attorney, Agent, or Firm* — Mei & Mark LLP

(57) ABSTRACT

Protective housings for an electrical device, such as a switches or receptacle, and methods for installing protective housings are disclosed. A protective housing for an electrical device includes a baseplate with an internal opening and first arcuate cutout along the internal opening. The protective housing also includes a first insert with a second arcuate cutout and at least one aperture. The first insert fits within the opening. The first and second arcuate cutouts form a through hole when the first insert is fitted within the opening.

20 Claims, 28 Drawing Sheets

(56) References Cited

U.S. PATENT DOCUMENTS

| | | |
|---|---|---|
| 8,389,858 B2 | 3/2013 | Drane |
| 8,633,385 B2 | 1/2014 | Korcz |
| 8,779,288 B1 | 7/2014 | Baldwin |
| 9,329,576 B1 | 5/2016 | Baldwin |
| 9,450,390 B1 | 9/2016 | Flegel |
| 9,723,738 B2 | 8/2017 | Weber |
| 2002/0112873 A1 | 8/2002 | Shotey |
| 2004/0000028 A1 | 1/2004 | Kim |
| 2009/0071681 A1 | 3/2009 | Junjie |
| 2009/0211779 A1 | 8/2009 | Drane |

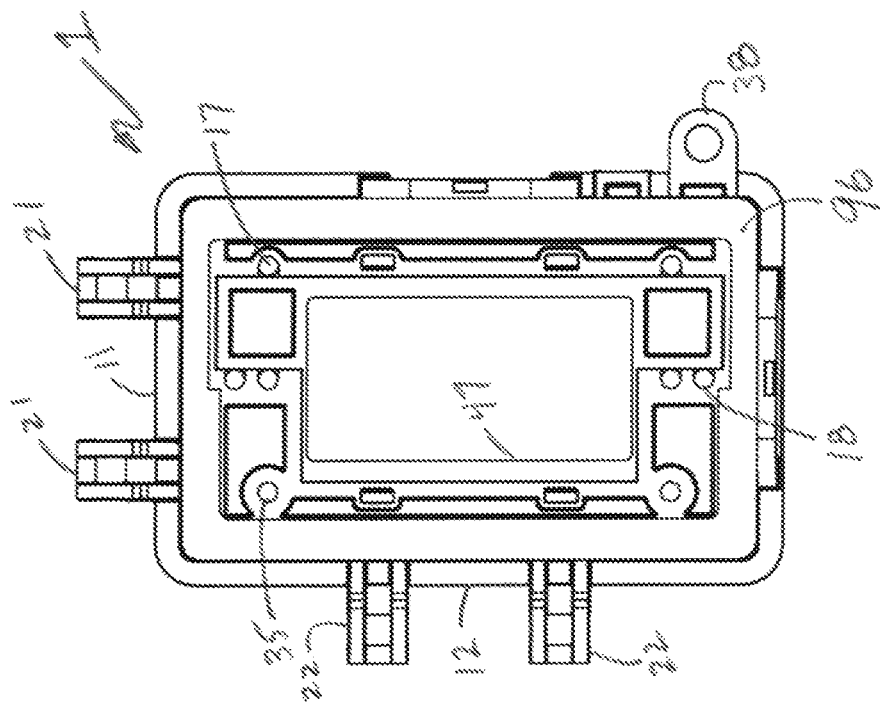
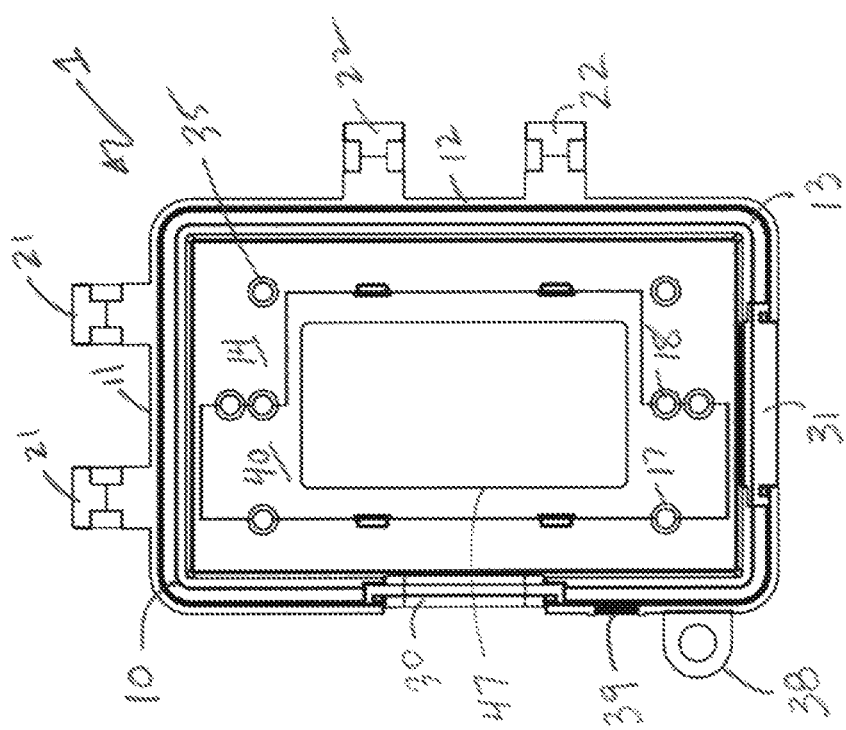

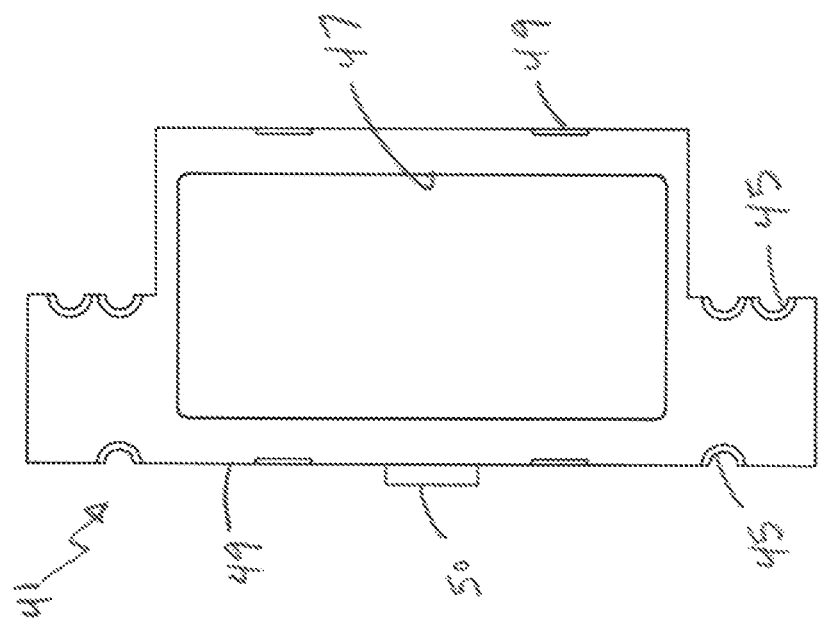

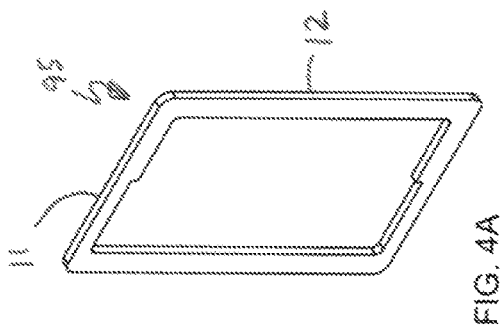
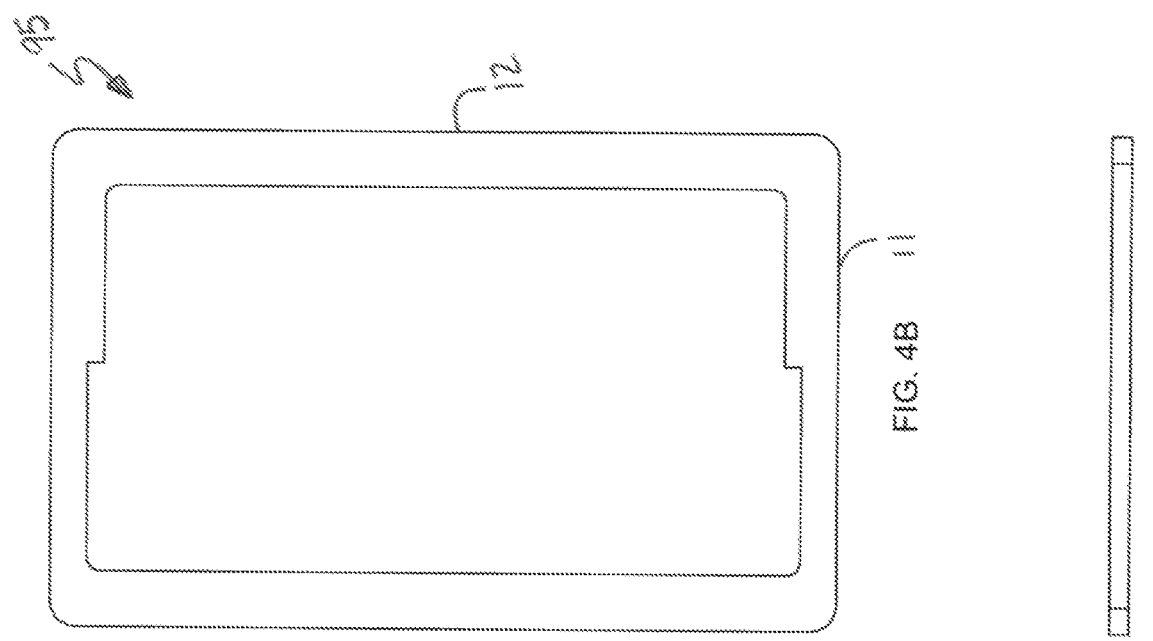

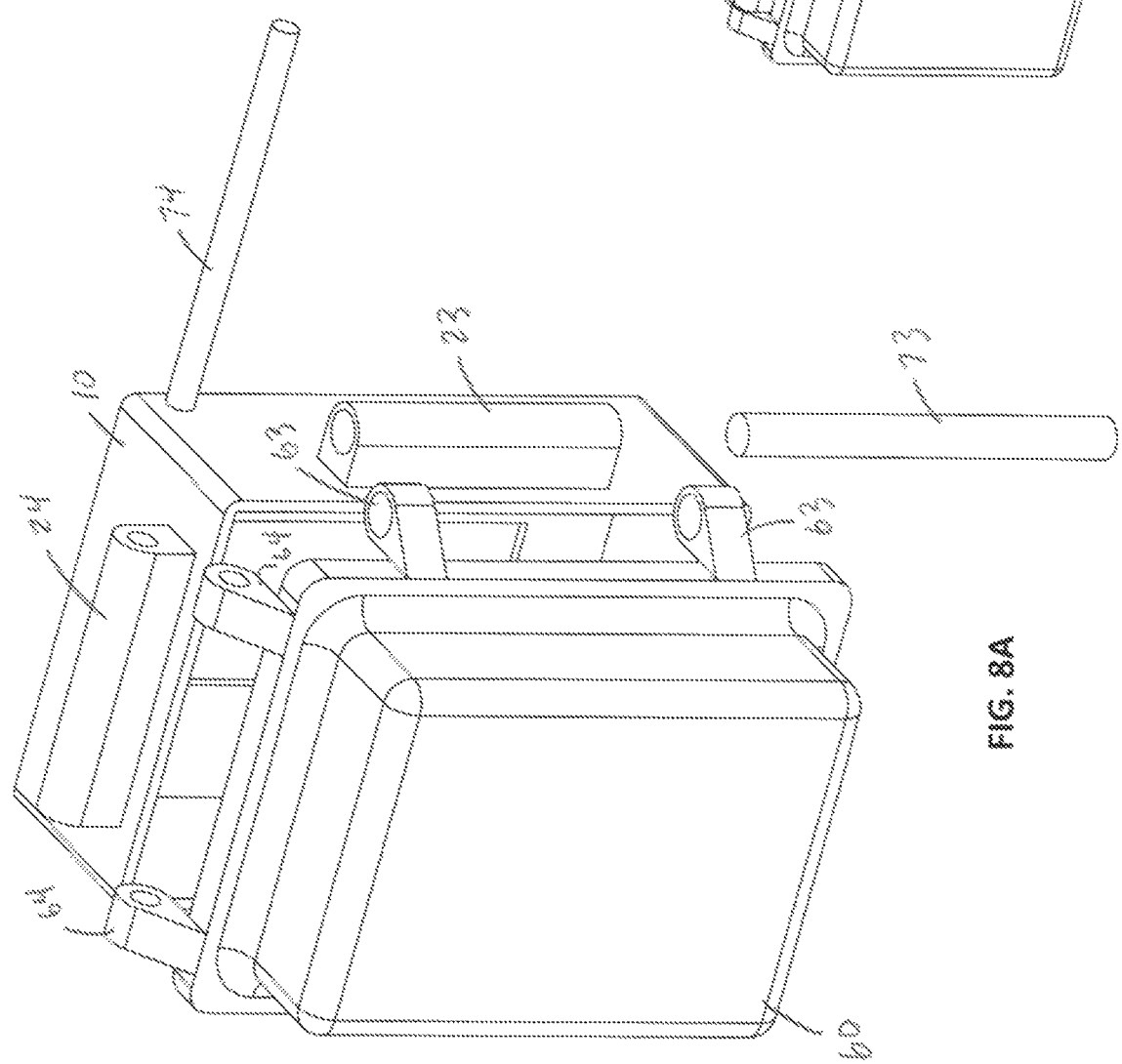
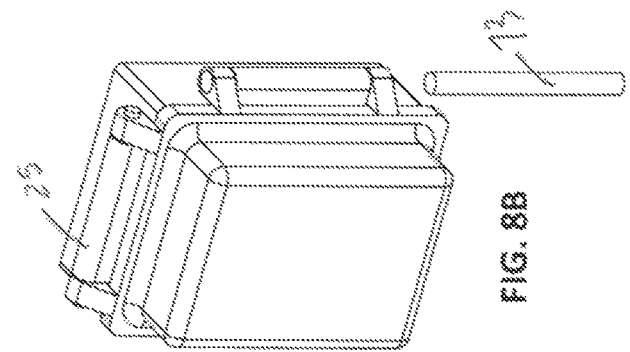
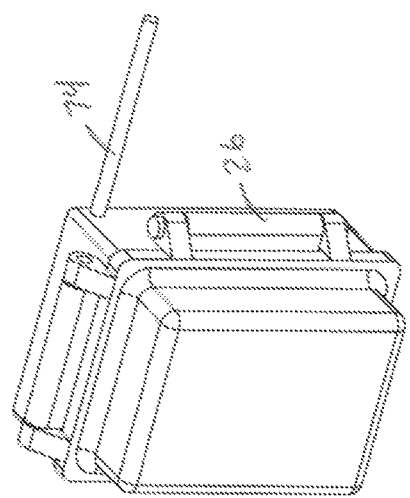
FIG. 8A
FIG. 8B
FIG. 8C

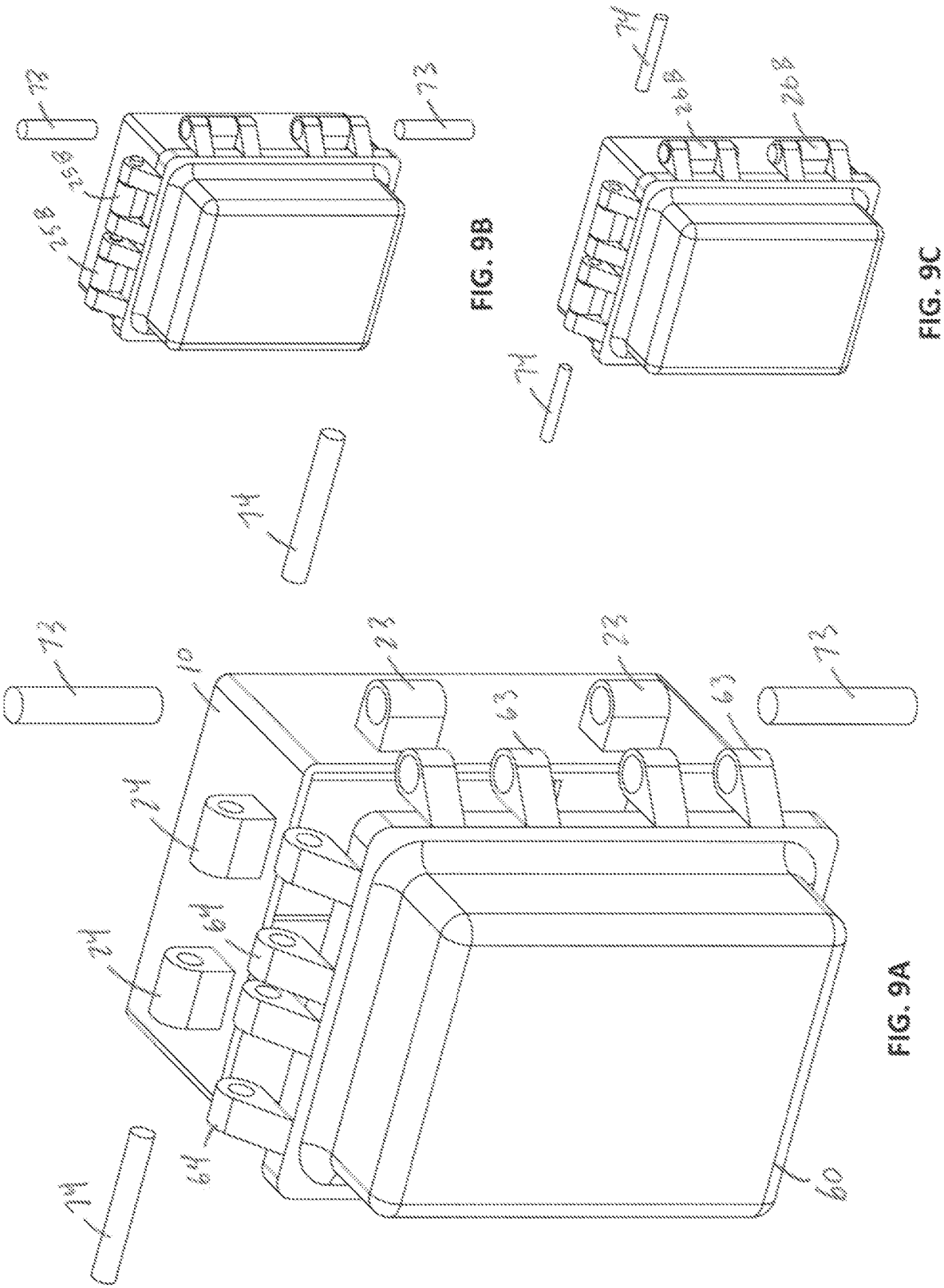

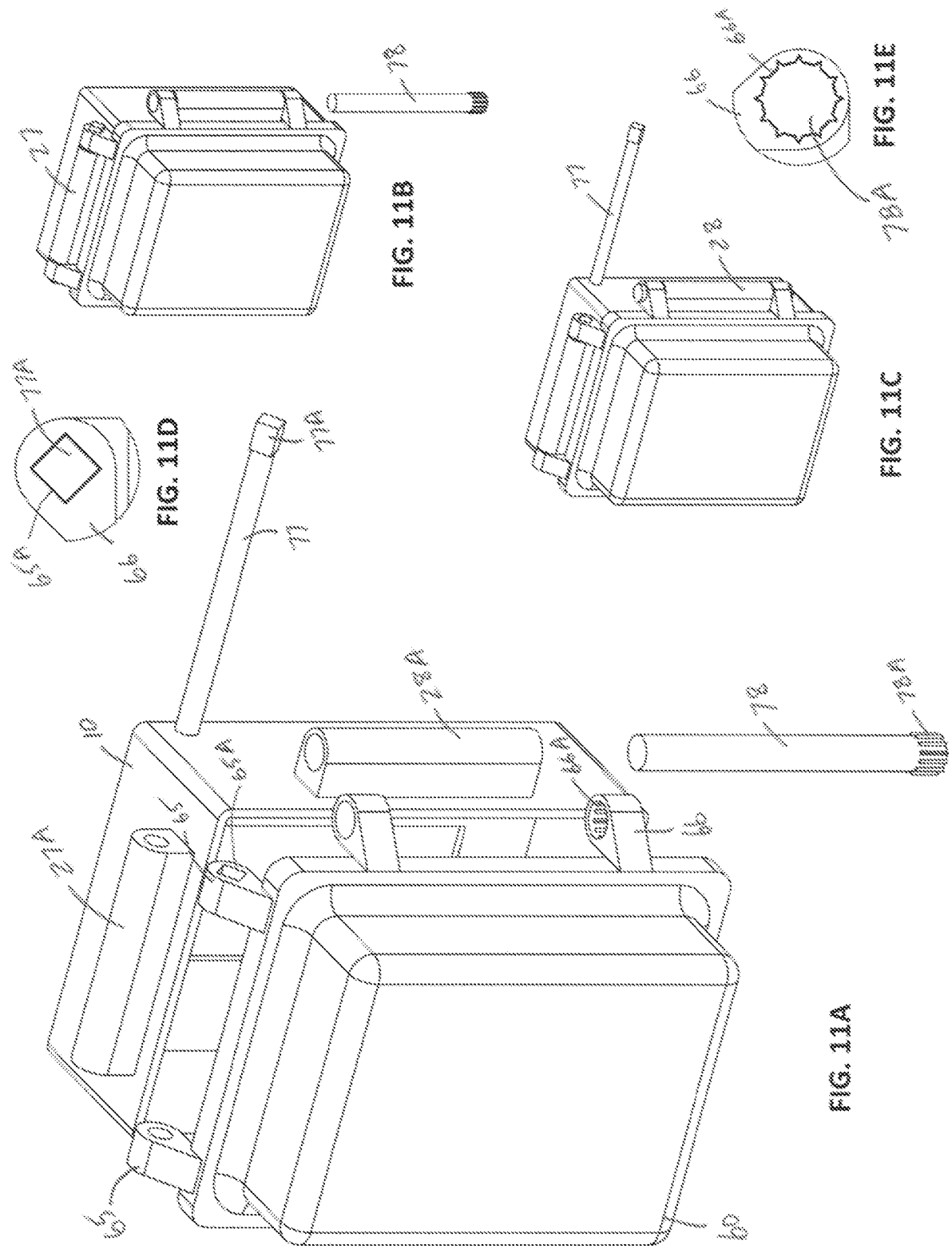

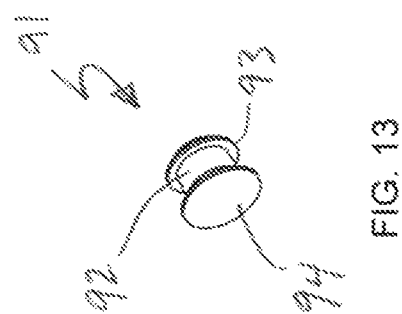

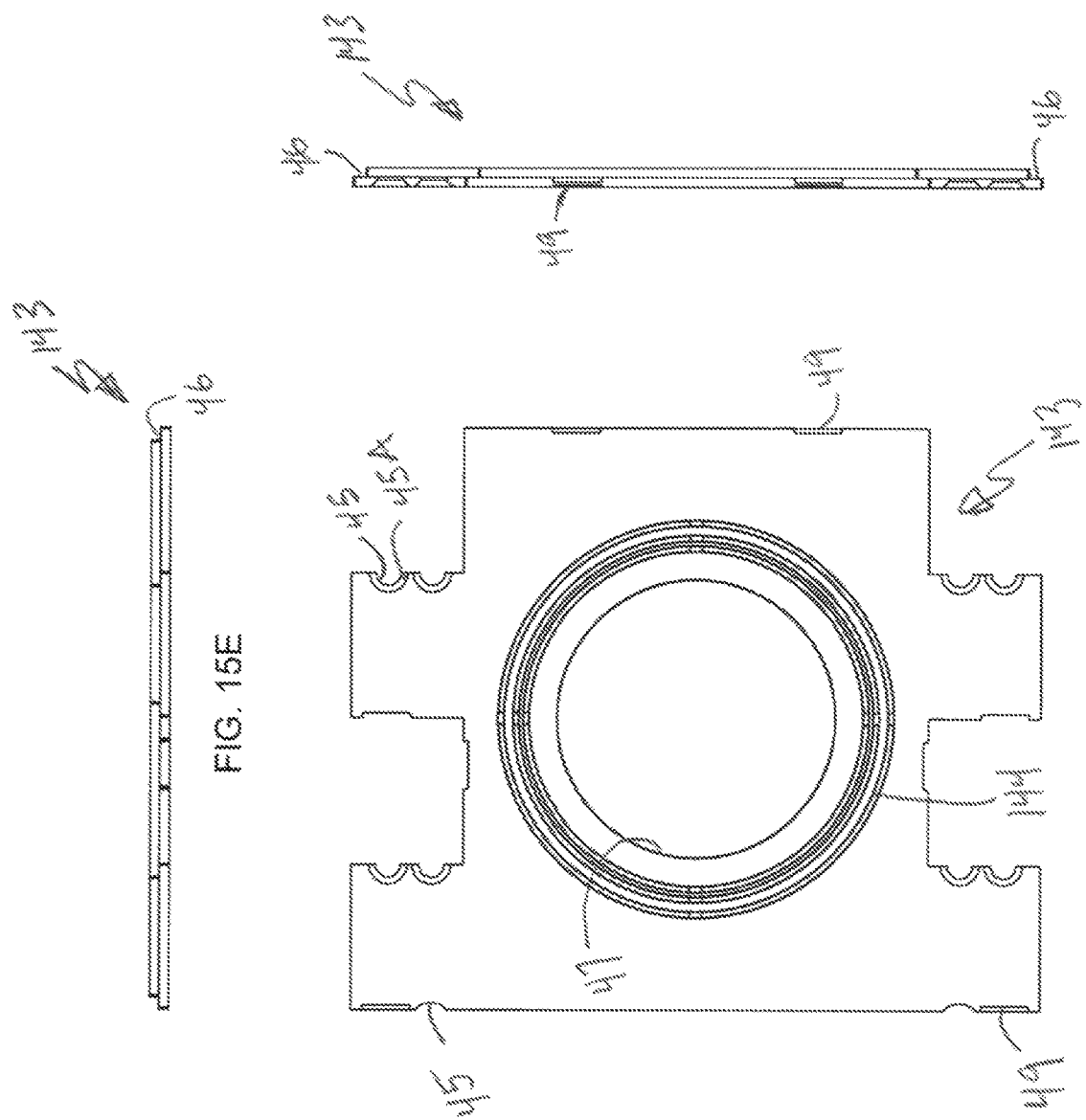

ELECTRICAL DEVICE PROTECTIVE HOUSING

CROSS-REFERENCE TO RELATED APPLICATIONS

This application is a continuation of co-pending U.S. patent application Ser. No. 15/137,992, filed on Apr. 25, 2016; which is a divisional of U.S. patent application Ser. No. 14/679,919, filed on Apr. 6, 2015, now U.S. Pat. No. 9,680,292; which claims priority under 35 U.S.C. 119(e)(1) to provisional U.S. Patent Application Ser. No. 61/975,943, filed Apr. 7, 2014, the disclosures of which are incorporated by reference herein in their entireties.

FIELD

This application relates to a protective housing for an electrical device such as a switch or receptacle and a method for its attachment.

BACKGROUND

An electrical device such as a switch or receptacle may be mounted to a structure, such as a house. Later, it may be desired to add a protective housing to protect or otherwise prevent access to the components of the switch or receptacle. Traditional protective housings require the complete removal of mounting screws prior to installation, which may further require unmounting the electrical device. Traditional protective housing installation may require co-installation of the protective device with the electrical device.

To address this problem, keyhole-type protective housings have been developed. Keyhole-type protective housings can be installed on already-mounted electrical devices due to their inclusion of at least one keyhole—a through hole with a large end to be placed over the head of an already-inserted mounting screw and a small end to be subsequently positioned under the screw head by laterally sliding the housing. However, keyhole-type protective housings have several disadvantages. First, if the head an already-inserted mounting screw is larger than the large end of the keyhole, the mounting screw would still need to be completely removed prior to installation.

Second, because a keyhole-type protective housing can move laterally along the keyhole, the user must take care to align the housing before tightening the mounting screws. The user often has to repeat this process until he is satisfied that the housing is level and plumb.

Third, keyhole-type products are out of compliance with National Electrical Code (NEC) and Underwriters' Laboratory (UL) standards because the keyholes comprise large diameter areas into which a child can insert their fingers or metallic objects, risking electrical shock. Further, water can seep into the large diameter areas if the housing lid is compromised, which is of concern because electrical devices with protective housings are often installed into areas exposed to rain or irrigation systems.

Fourth, because keyhole-type protective housings require the user to slide the faceplate in a plane parallel with the front of the electrical device, any sealing gaskets attached to the rear of keyhole-type protective housing can suffer significant abrasion from the surface texture of the surrounding wall (e.g., brick or stucco) or on sharp edges for the electrical mounting box during installation. And, if the gasket is torn or compromised by this abrasion, water can seep into the electrical device and create a shock hazard or short.

An additional issue is size- and electrical device-specific product matching. Electrical devices requiring protection may be of a variety of types, including ground-fault circuit interrupter (GFCI) outlets, duplex outlets, 220V outlets, and toggle switches; may be sized as 1-gang, 2-gang, 3-gang, 4-gang or larger; and may include multiple outlet or switch types. Traditional and key-hole protective housings are specifically matched to a particular electrical device size and type configuration—and sometimes matched to a specific electrical device version, even including particular mounting screws. This can limit the end user's ability to efficiently acquire a suitable protective housing for a switch or receptacle when that electrical device does not come as a kit with a protective device.

SUMMARY

Devices and methods disclosed herein overcome some or all of the above disadvantages and improve the art by way of a providing an improved protective housing, sometimes including a weatherproof cover or other lid.

In one embodiment, a protective housing for an electrical device includes a baseplate with an internal opening and first arcuate cutout along the internal opening. The protective housing also includes a first insert with a second arcuate cutout and at least one aperture. The first insert fits within the opening. The first and second arcuate cutouts form a through hole when the first insert is fitted within the opening.

In another embodiment, a protective housing includes a baseplate with a first arcuate cutout and an insert with a second arcuate cutout. The protective housing is formed when the baseplate and the insert are assembled. The protective housing provides a protective barrier to prevent accidental electrical shocks when the protective housing is mounted to an electrical device. The first and second arcuate cutouts align together to form a through hole that can to receive a first screw.

In yet another embodiment, a protective housing can be formed over an electrical device by placing a baseplate over the electrical device, aligning a first arcuate cutout on the baseplate with a mounting screw on the electrical device, providing an insert with a second arcuate cutout, aligning the second arcuate cutout of the insert with the first arcuate cutout and the mounting screw, positioning the insert against the baseplate, and tightening the mounting screw.

In yet another embodiment, a protective housing kit for an electrical device includes a baseplate, a lid, a first hinge pin, and a second hinge pin. The baseplate includes a first baseplate hinge component on a first baseplate side and a second baseplate hinge component on a second baseplate side. The lid includes a first lid hinge component on a first lid side and a second lid hinge component on a second lid side. The first hinge pin has a first structural feature and the second hinge pin has a second structural feature distinct from the first structural feature. The first baseplate hinge component, the first lid hinge component, and the first hinge pin can be assembled into a first hinge that rotatably connects the baseplate and the lid. The second baseplate hinge component, the second lid hinge component, and the second hinge pin can be assembled into a second hinge that rotatably connects the baseplate and the lid.

Additional objects and advantages will be set forth in part in the description which follows, and in part will be obvious from the description, or may be learned by practice of the disclosure. The objects and advantages will also be realized and attained by means of the elements and combinations particularly pointed out in the appended claims. It is to be understood that both the foregoing general description and the following detailed description are exemplary and explanatory only and are not restrictive of the claimed invention.

BRIEF DESCRIPTION OF THE DRAWINGS

FIGS. 1A-1B are views of a protective housing.
FIG. 3E is a view of a GFCI insert with handle.
FIGS. 4A-4C are views of a gasket.
FIGS. 8A-8C illustrate an alternative baseplate and lid combination, including hinge assemblies.
FIGS. 9A-9C illustrate another alternative baseplate and lid combination, including hinge assemblies.
FIGS. 11A-11E illustrate another alternative baseplate and lid combination, including hinge assemblies.
FIG. 13 is a view of a form-fitting seal for a through hole.
FIGS. 15C-15E are views of a 220V insert.

DETAILED DESCRIPTION

Figure 2B:
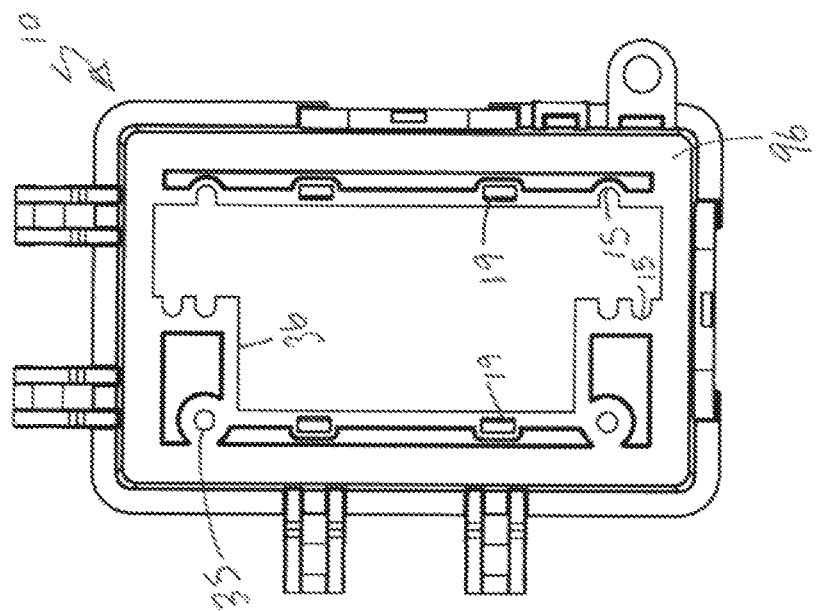
FIGS. 2A-2E are views of a baseplate.
Figure 2A:
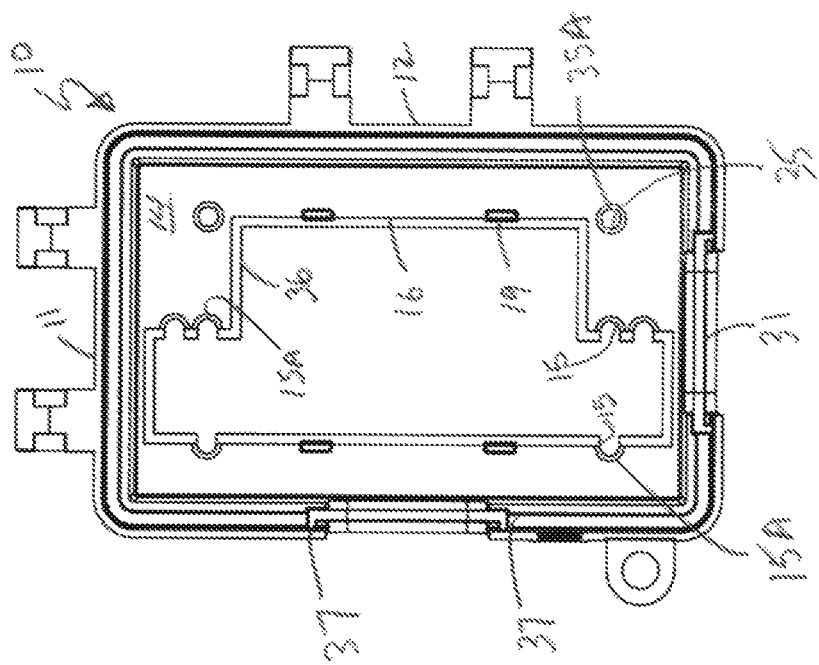
Figure 2C:
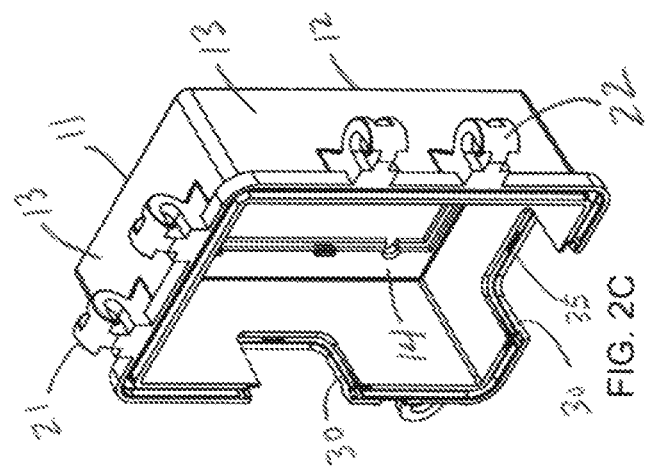
Figure 2D:
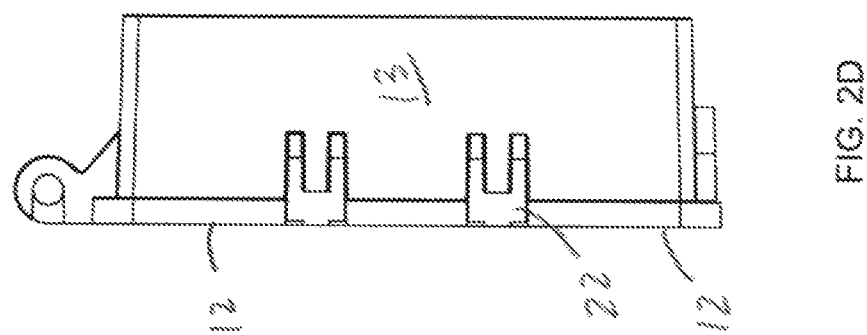
Figure 2E:
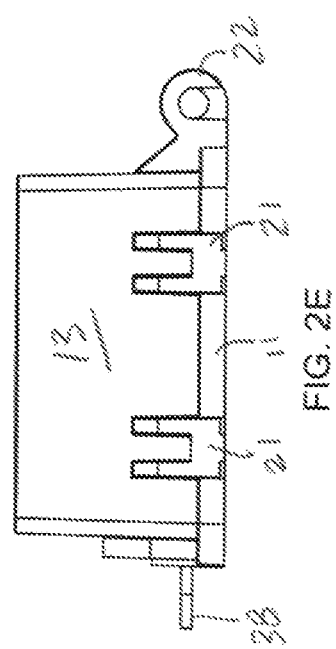

Reference will now be made in detail to the examples, which are illustrated in the accompanying drawings. Wherever possible, the same reference numbers will be used throughout the drawings to refer to the same or like parts. Directional references such as "top," "horizontal," and "vertical" are for ease of reference to the figures. Although the drawings show a weatherproof-type cover or "hood," it should be understood that the method and attachment device is not so limited. The devices and methods are applicable for the attachment of a protective housing with or without an attached lid, such as a face plate, weatherproof cover, or other protective plate to an electrical device such as a switch or receptacle.

FIGS. 1A and 1B provide a front and back view, respectively, of a protective housing 1 comprising a baseplate 10 and an insert 40. Protective housing 1 can be installed upon an electrical device, such as an electrical outlet or toggle switch, and can further include a weatherproof lid 60, as depicted, for example, in FIG. 7A. When installed, the housing provides a protective barrier to prevent accidental electrical shocks to the user and further protects the electrical device from water, dirt, or debris.

As shown in FIGS. 1A and 1B, baseplate 10 can include a generally flat portion 14 and walls 13 formed at the perimeter of the flat portion 14. The walls 13 for protective housing 1 can include a vertical baseplate hinge component 21 on a vertical side 11 of protective housing 1, which is shown the shorter side in the figures, and a horizontal baseplate hinge component 22 on a horizontal side 12 of protective housing 1, which is shown the longer side in the figures. As noted, the terms "vertical" and "horizontal" are used for ease of reference to the figures, and the person of skill in the art would understand that protective housing 1 can be mounted on an electrical device at any angle. For example, vertical side 11 can be positioned horizontally and horizontal side 12 can be positioned vertically. Moreover, baseplate hinge components 21 and 22 can each include multiple portions, as shown, for example, in FIGS. 1A-2E.

FIGS. 2A-2E provide front, back, perspective, horizontal side, and vertical side views, respectively, of baseplate 10 without insert 40. Baseplate flat portion 14 comprises include an internal opening 36, which is configured to fit and receive insert 40. The perimeter of internal opening 36 includes one or more baseplate arcuate cutouts 15. Preferably, a recessed area 15A borders each baseplate arcuate cutout 15. When insert 40 is installed into baseplate 10, one or more central through holes 18 and/or side through holes 17 are formed by the alignment of corresponding baseplate arcuate cutouts 15 and insert arcuate cutouts 45. Through holes 18 and 17 are configured to receive a screw and can be used to secure the protective housing to the electrical device.

In a typical use of protective housing 1, approximately half of the through holes will be filled with mounting screws. Thus, protective housing 1 may include one or more form-fitting seals 91 to fill through holes unoccupied by mounting screws after assembly, thereby providing additional protection to the electrical device. FIG. 13 depicts seal 91, which is preferably is made of rubber or plastic and includes a shaft 92 and two rims 93 and 94 on each side of the shaft. In one embodiment, seal 91 is symmetrical in design such that rims 93 and 94 are identical.

The perimeter of internal opening 36 may further include a stepped portion 16 to mate with a corresponding stepped portion 46 of insert 40, preferably on the front of baseplate flat portion 14. And in one embodiment, stepped portion 16 includes baseplate arcuate cutout recessed areas 15A.

Baseplate flat portion 14 can include one or more baseplate snap elements 19 to engage with corresponding insert snap elements 49 of insert 40. Additionally, baseplate flat portion 14 can include one or more integral baseplate through holes 35, which can be used to secure the protective housing to the electrical device. Preferably, a recessed area 35A surrounds each integral baseplate through hole 35.

Baseplate 10 can further include baseplate lock hole 38 and/or baseplate closure mechanism 39 on walls 13, preferably on the wall portion opposite from horizontal baseplate hinge component 22. If lid 60 is included in protective housing 1, as depicted, for example in FIG. 7A, baseplate closure mechanism 39 can engage with lid closure mechanism 39 to temporarily seal protective housing 1 when lid 60 is closed, further protecting enclosed electrical devices from the elements. Baseplate lock hole 38 aligns with lid lock hole 68 when lid 60 is closed, providing the opportunity to lock the protective housing using a standard combination or key lock. Baseplate lock hole 38 and/or baseplate closure mechanism 39 can be formed integrally with walls 13 or can be attached thereto.

Gasket 95 can be positioned against or adhered to gasket receiving surface 96 on backside of baseplate 10, shown in FIGS. 1B and 2B, to create or improve the seal between the baseplate 10 and a wall or structure surrounding the electrical device when protective housing 1 is installed. FIGS. 4A-4C illustrate perspective, front and vertical side views, respectively, of an exemplary gasket 95.

Insert 40 includes at least one aperture 47, which is configured to receive a particular type of electrical device, and one or more insert arcuate cutouts 45 on its outer perimeter. Preferably, a recessed area 45A borders each insert arcuate cutout 45. As noted above, insert 40 can include one or more insert snap elements 49 to engage with baseplate snap elements 19. Snap elements 19 and 49 can include spring-type snap elements, shelf-type snap elements, and/or any other type of snap elements known in the art, provided that each corresponding baseplate snap element 19 and insert snap element 49 are configured to engage with one another.

In order to accommodate a wide array of electrical devices, multiple types of inserts 40 with different apertures are contemplated. For example, insert 40 depicted in FIGS. 1A-1B is a GFCI insert 41, which contains a single aperture 47 sized to accommodate a GFCI outlet. FIG. 3E is an illustration of GFCI insert 41 that has not been installed in a baseplate 10. GFCI insert 41 depicted in FIG. 3E further includes a handle 50, which can be included in insert 40 to provide better ergonomic gripping of the insert during assembly or disassembly of protective housing 1.

Figure 3B:
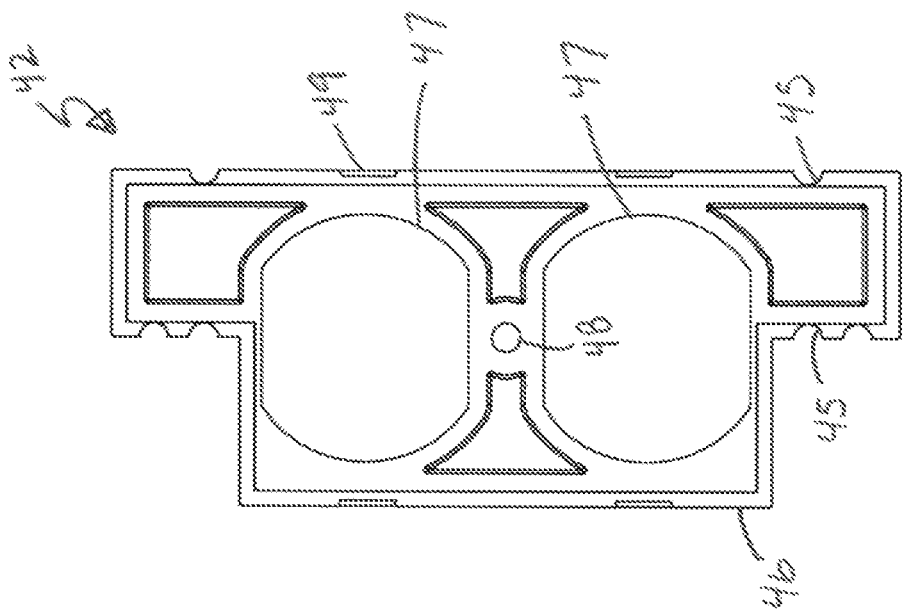
FIGS. 3A-3B are views of a duplex insert.
Figure 3A:
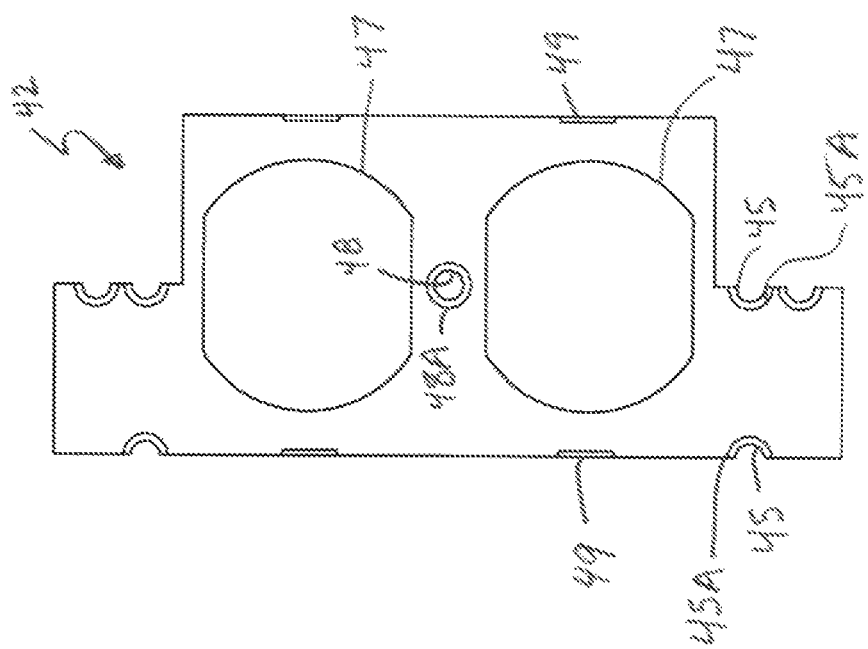
Figure 3C:
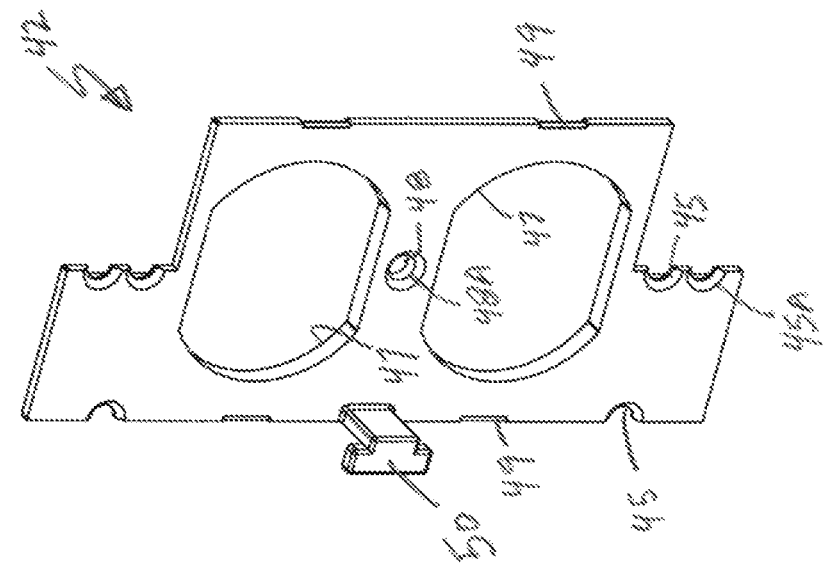
FIGS. 3C-3D are views of a duplex insert with handle.
Figure 3D:
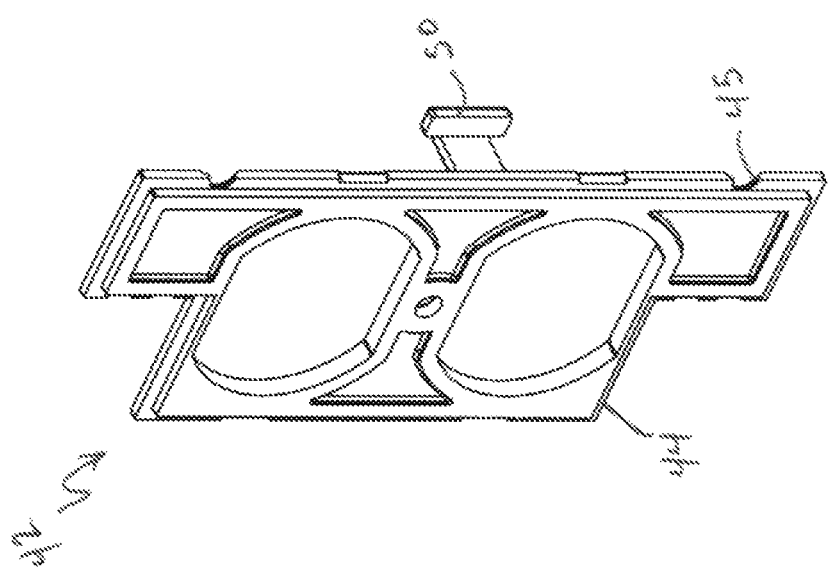

As another example, FIGS. 3A-3B depict front and back sides, respectively, of duplex insert 42, which is a type of insert 40 with two apertures to accommodate a standard duplex outlet. And, FIGS. 3C-3D depict perspective front and back sides, of an alternative duplex insert 42 that further includes handle 50. Duplex insert 42 can further include integral insert through hole 48, which can be used to further secure insert 40 to the electrical device. Preferably, a recessed area 48A surrounds each integral insert through hole 48.

The GFCI and duplex insert embodiments disclosed herein are exemplary. It is contemplated that other inserts 40 may include alternative aperture configurations to accommodate switches, such as toggle switches and dimmer switches, and various other electrical outlets known in the art. In another embodiment, insert 40 can include breakout lines to allow custom apertures to be selected and created, thus providing additional flexibility in accommodating a variety of electrical devices during installation of protective housing 1.

As depicted in FIGS. 3B and 3D, the backside of insert 40 can include a stepped portion 46 along its outer perimeter. Stepped portion 46 is configured to mate with corresponding stepped portion 16 on the front of baseplate 10. During installation of such embodiments of protective housing 1, insert 40 is positioned on top of the front of baseplate 10. In alternative embodiments, stepped portion 46 can be located on the front of insert 40 and stepped portion 16 can be located on the back of baseplate 10, such that insert 40 would be positioned behind the back of baseplate 10 during installation.

Figure 7A:
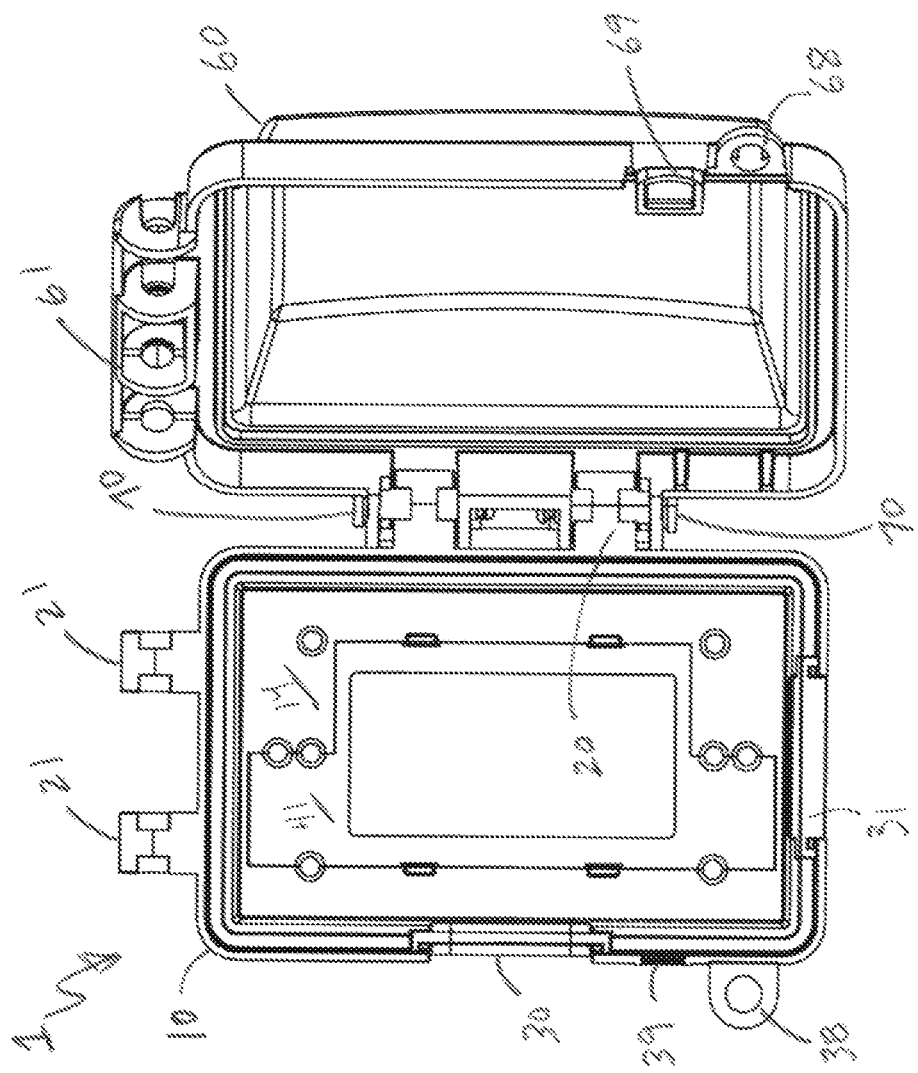
FIG. 7A is a view of a protective housing including an attached lid.
Figure 7C:
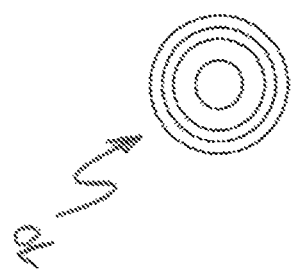
FIGS. 7B-7C are views of a hinge pin.
Figure 7B:
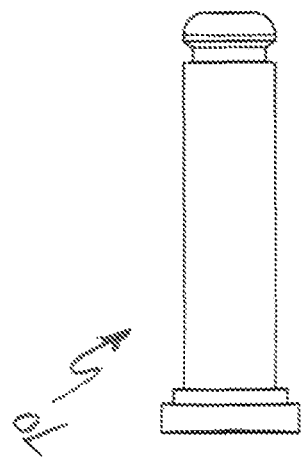

FIGS. 5A-5D provide perspective, horizontal side, front, and vertical side views, respectively, of lid 60. Horizontal side 12 of lid 60 can include a horizontal lid hinge component 62 configured to correspond with horizontal baseplate hinge component 22. As depicted in FIG. 7A, when assembled with one or more hinge pins 70, horizontal lid hinge component 62 and horizontal baseplate hinge component 22 form a hinge 20 that rotatably connects baseplate 10 and lid 60 on horizontal side 12. FIGS. 7B and 7C depict further detail of an embodiment of hinge pin 70. Similarly, vertical side 11 of lid 60 can include a vertical lid hinge component 61 configured to correspond with vertical baseplate hinge component 21. When assembled with one or more hinge pins 70, vertical lid hinge component 61 and vertical baseplate hinge component 21 form a hinge 20 that rotatably connects baseplate 10 and lid 60 on vertical side 11.

Preferably, horizontal lid hinge component 62 and horizontal baseplate hinge component 22 are positioned along baseplate 10 and lid 60, respectively, to include clearances such that the horizontal hinge components 22 and 62 do not touch or otherwise interfere with the rotation of lid 60 about an assembled vertical hinge 20. And, preferably, vertical lid hinge component 61 and vertical baseplate hinge component 21 are positioned on baseplate 10 and lid 60, respectively, to include clearances such that the vertical hinge components 21 and 61 do not touch or otherwise interfere with the rotation of lid 60 about an assembled horizontal hinge 20.

Figure 5A:
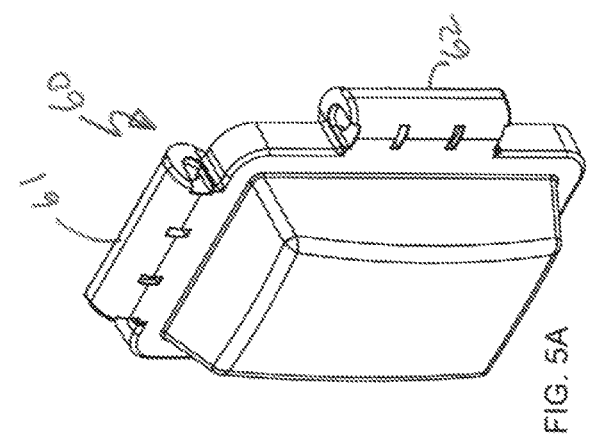
FIGS. 5A-5D are views of a lid.
Figure 5B:
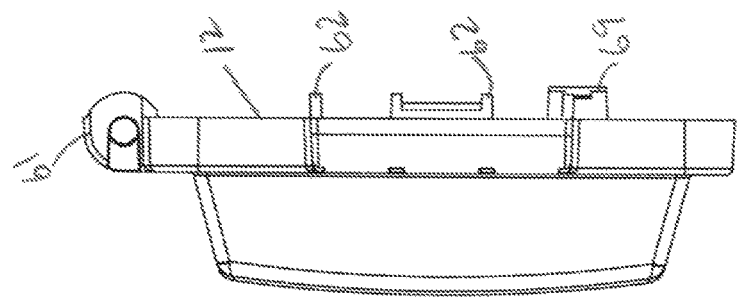
Figure 5C:
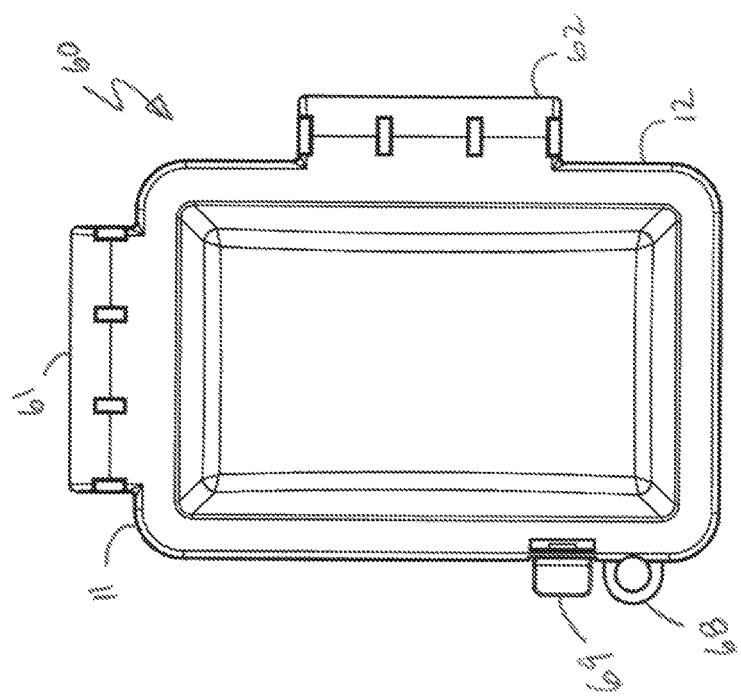
Figure 5D:
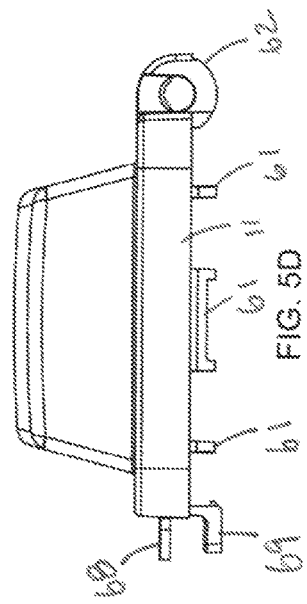
Figure 6A:
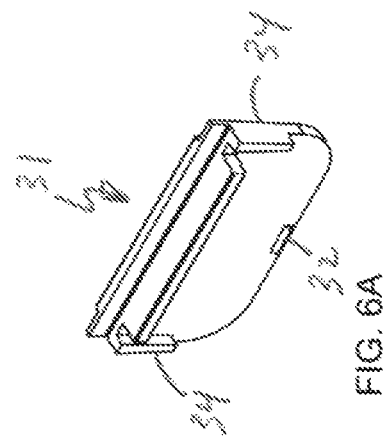
FIGS. 6A-6D are views of a plug for a baseplate gap.
Figure 6B:
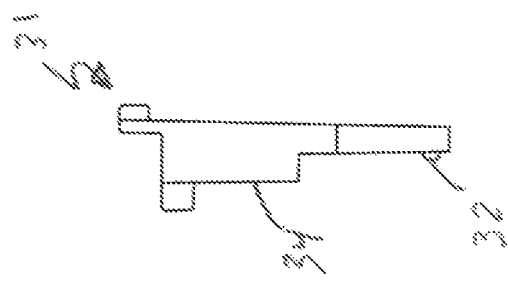
Figure 6C:
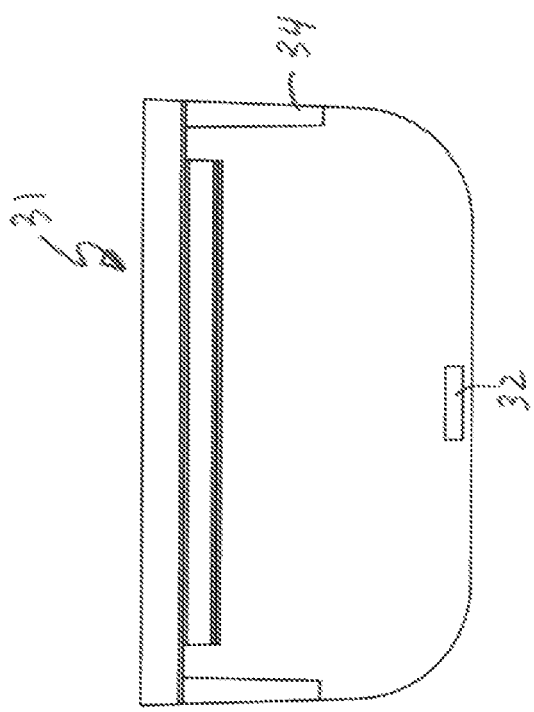
Figure 6D:
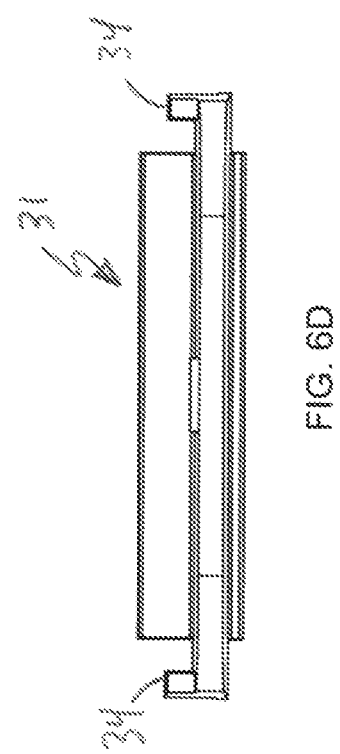

In one embodiment, the hinge pins are configured lock into appropriate lid and baseplate hinge components using interference fit, detents, living hinge snap features, threads, or other locking features to form hinge 20. It is also contemplated that a hinge pin can include a cap head at one hinge pin to prevent the pin from passing through the lid and baseplate hinge components. Such features can prevent the accidental disconnection of a hinge pin from the baseplate hinge component and the lid hinge component of an assembled hinge. As shown in FIGS. 5C and 5D, Lid 60 can further include lid lock hole 68 and/or lid closure mechanism 69, preferably on the wall portion opposite from horizontal lid hinge component 62.

FIGS. 8A-11E illustrate alternate configurations for attaching lid 60 to baseplate 10 via a hinge, wherein hinge pins are configured to be used only in hinge assemblies on a particular side of the protective housing.

FIGS. 8A-8C illustrate a lid attachment configuration wherein hinge pins are not interchangeable due to a difference in diameter between hinge pins. As shown FIG. 8A, baseplate 10 can include a larger diameter baseplate hinge component 23 and lid 60 can include larger diameter lid hinge component 63. Larger diameter baseplate hinge component 23 and larger diameter lid hinge component 63 correspond to one another and are configured to be assembled into larger diameter hinge 26 by the insertion of larger diameter pin 73 into the recesses of hinge components 23 and 63, as shown in FIG. 8C. Although FIGS. 8A-8C illustrate larger diameter baseplate hinge component 23 as horizontal baseplate hinge component 22 and larger diameter lid hinge component 63 as horizontal lid hinge component 62, the larger diameter components 23 and 63 can alternatively be positioned on vertical side 11 of the protective housing 1.

Also as shown FIG. 8A, baseplate 10 can include a smaller diameter baseplate hinge component 24 and lid 60 can include smaller diameter lid hinge component 64. Smaller diameter baseplate hinge component 24 and smaller diameter lid hinge component 64 correspond and are configured to be assembled into smaller diameter hinge 25 by the insertion of smaller diameter pin 74 into the recesses of hinge components 24 and 64, as shown in FIG. 8B. Although FIGS. 8A-8C depict smaller diameter baseplate hinge component 24 as vertical baseplate hinge component 21 and smaller diameter lid hinge component 64 as vertical lid hinge component 61, the smaller diameter components 24 and 64 can alternatively be positioned on horizontal side 12 of the protective housing 1.

Larger diameter hinge pin 73 cannot fit into the recesses of smaller diameter hinge components 24 and/or 64, and therefore these elements cannot be assembled into a suitable hinge 20. Similarly, smaller diameter hinge pin 74 can only be loosely inserted into the recesses of larger diameter hinge components 23 and 63, and therefore these elements cannot be assembled into a suitable hinge 20. Further, if smaller diameter hinge pin 74 has locking features to engage with corresponding locking features in smaller diameter components 24 and/or 64, such features are unlikely to engage with locking features in larger diameter components 23 and 63. Thus, a working hinge 20 cannot be assembled if an inappropriate diameter pin is used.

Consistent with FIGS. 8A-8C, a protective housing kit can include baseplate 10, lid 60, larger diameter hinge pin 73, and smaller diameter hinge pin 74. Thus, during installation of protective housing 1, the user can elect to assemble smaller diameter hinge 25 and discard larger diameter hinge pin 73, as in FIG. 8B; or elect to assemble larger diameter hinge 26 and discard smaller diameter hinge pin 74, as in FIG. 8C.

FIGS. 9A-9C depict a hinge configuration similar to that of FIGS. 8A-8C, but in this embodiment larger diameter hinge 26 includes two larger diameter sub-hinges 26B and assembled smaller diameter hinge 25 includes two smaller diameter sub-hinges 25B. As shown in FIGS. 9A and 9C, larger diameter hinge 26 can include two larger diameter pins 73, and both larger diameter baseplate hinge component 23 and larger diameter lid hinge component 63 can include additional parts. For example, as shown, larger diameter baseplate hinge component 23 includes two parts and larger diameter lid hinge component 63 includes four parts. Similarly, as shown in FIGS. 9A and 9B, smaller diameter hinge 25 can include two smaller diameter pins 74, and both smaller diameter baseplate hinge component 24 and smaller diameter lid hinge component 64 can include additional parts. For example, as shown, smaller diameter baseplate hinge component 24 includes two parts and smaller diameter lid hinge component 64 includes four parts. Consistent with FIGS. 9A-9C, a protective housing kit can include baseplate 10, lid 60, two larger diameter hinge pins 73, and two smaller diameter hinge pins 74.

In another embodiment, protective housing 1 can be configured such that larger diameter hinge 26 can be assembled with more than two larger diameter sub-hinges 26B and/or smaller diameter hinge 25 can be assembled with more than two smaller diameter sub-hinges 25B. In this embodiment, a corresponding greater number of larger diameter hinge pins 73 and smaller diameter hinge pins 74 may be included in a protective housing kit.

In yet another embodiment, protective housing 1 can be configured to include multiple sub-hinges, and not all sub-hinges on the respective vertical 11 and horizontal 12 sides of the protective housing would require a side-specific pin for assembly. In this embodiment, some sub-hinges on each side can be assembled using a generic hinge pin that is not side-specific. That is, only a portion of the sub-hinges can be configured to accommodate a pin with a side-specific diameter.

Figure 10B:
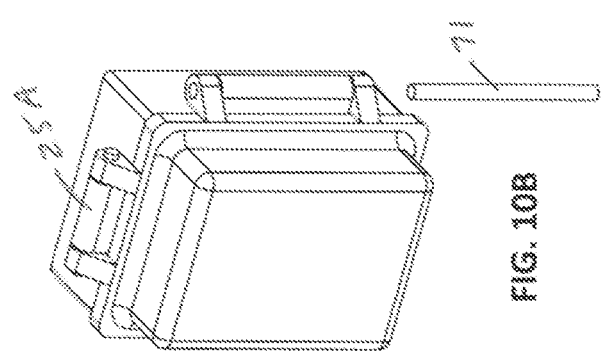
FIGS. 10A-10C illustrate another alternative baseplate and lid combination, including hinge assemblies.
Figure 10C:
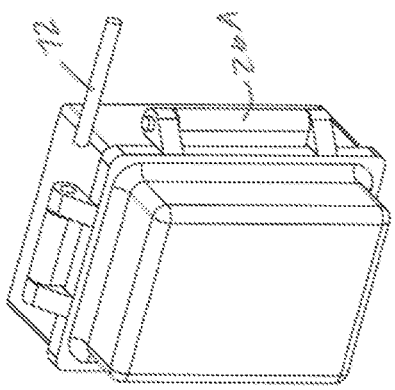
Figure 10A:
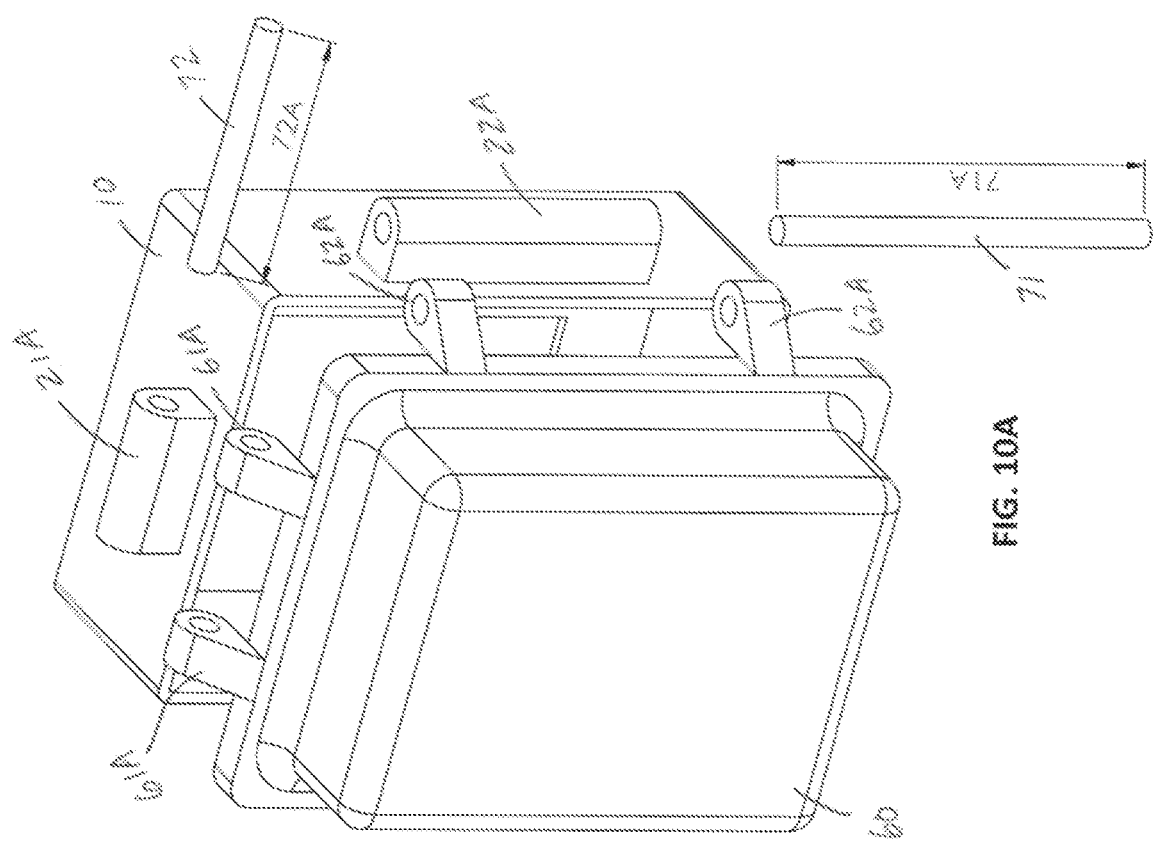

FIGS. 10A-10C illustrate a lid attachment configuration wherein hinge pins are not interchangeable due to a difference in length between hinge pins. As shown in FIG. 10A, baseplate 10 can include a longer baseplate hinge component 22A and lid 60 can include longer lid hinge component 62A. Longer baseplate hinge component 22A and longer lid hinge component 62A correspond to one another and are configured to be assembled into longer hinge 26A by the insertion of longer pin 71 into the recesses of hinge components 22A and 62A, as shown in FIG. 10C. Longer pin 71 is of length 71A, and the parts of hinge components 22A and 62A are sized and spaced to cumulatively approximate length 71A. FIGS. 10A-10C depict longer baseplate hinge component 22A as horizontal baseplate hinge component 22 and longer lid hinge component 62A as horizontal lid hinge component 62, but the longer components 22A and 62A can alternatively be positioned on vertical side 11 of the protective housing 1.

Also as shown FIG. 10A, baseplate 10 can include a shorter baseplate hinge component 21A and lid 60 can include shorter lid hinge component 61A. Shorter baseplate hinge component 21A and shorter lid hinge component 61A correspond and are configured to be assembled into shorter hinge 25A by the insertion of shorter pin 72 into the recesses of hinge components 21A and 61A, as shown in FIG. 10B. Shorter pin 72 is of length 72A, and the parts of hinge components 21A and 61A are sized and spaced to cumulatively approximate length 72A. FIGS. 10A-10C depict shorter baseplate hinge component 21A as vertical baseplate hinge component 21 and shorter lid hinge component 61A as vertical lid hinge component 61, but the shorter components 21A and 61A can alternatively be positioned on horizontal side 12 of the protective housing 1.

Because shorter hinge pin 72 is significantly shorter than length 71A, shorter hinge pin 72 cannot fully occupy the recesses of longer hinge components 22A and 62A. Therefore, these elements—22A, 61A, and 71—cannot be assembled into a suitable hinge 20. Similarly, because longer hinge pin 71 is significantly longer than length 72A, when inserted into the recesses of shorter hinge components 21A and 61A, longer hinge pin 71 would extend significantly beyond hinge components 21A and 61A. Such an assembled hinge, even if assembly is possible, is disfavored. Thus, a user assembling the hinge configurations of FIGS. 10A-10C would understand which of shorter pin 72 or longer pin 71 to use depending on whether shorter hinge 25A or longer hinge 26A is desired to be assembled.

Consistent with FIGS. 10A-10C, a protective housing kit can include baseplate 10, lid 60, longer hinge pin 71, and shorter hinge pin 72. Thus, during installation of protective housing 1, the user can elect to assemble short hinge 25A and discard longer hinge pin 71, as in FIG. 10B; or elect to assemble short hinge 26A and discard shorter hinge pin 72, as in FIG. 10C.

FIGS. 11A-11E illustrate a lid attachment configuration wherein hinge pins are not interchangeable due to a difference in shape of the heads of hinge pins. As shown FIG. 11A, baseplate 10 can include a first baseplate hinge component 27A and lid 60 can include first shaped lid hinge component 65. One part of first lid hinge component 65 can include a first shaped head receiving portion 65A. First baseplate hinge component 27A and first shaped lid hinge component 65 correspond to one another and are configured to be assembled into first shaped hinge 27 by the insertion of first shaped pin 77 into the recesses of hinge components 27A and 65, as shown in FIG. 11B. First shaped hinge pin 77 is generally cylindrical but includes a first shaped head 77A. As shown in FIG. 11D, first shaped head 77A is configured to snugly fit into shaped head receiving portion 65A of first shaped lid hinge component 65 when first shaped hinge 27 is assembled.

Also as shown FIG. 11A, baseplate 10 can include a second baseplate hinge component 28A and lid 60 can include second shaped lid hinge component 66. One part of second lid hinge component 66 can include a shaped head receiving portion 66A. Second baseplate hinge component 28A and second shaped lid hinge component 66 correspond to one another and are configured to be assembled into second shaped hinge 28 by the insertion of second shaped pin 78 into the recesses of hinge components 28A and 66, as shown in FIG. 11C. Second shaped hinge pin 78 is generally cylindrical but includes a first shaped head 78A. As shown in FIG. 11E, second shaped head 78A is configured to snugly fit into shaped head receiving portion 66A of second lid hinge component 66 when second shaped hinge 28 is assembled.

First shaped head 77A cannot fit into shaped head receiving portion 66A of second lid hinge component 66. And, second shaped head 78A cannot fit into shaped head receiving portion 65A of first shaped lid hinge component 65. Moreover, the snug fit between the shaped pin heads 77A and 78A and shaped head receiving portions 66A and 66B, respectively, can serve to further secure a shaped pin within an assembled hinge. The shapes of first shaped head 77A and second shaped head 78A depicted in the figures are illustrative and not limited to the cross-sectional square and star shapes shown. For example, a shaped pin head 77A or 78A may have a triangular, rectangular, other polygonal, oval-shaped, or irregularly-shaped cross section. Alternatively, the lid configuration can include a cylindrical pin without a shaped head in lieu of one of the shaped pins. Further in some embodiments, baseplate hinge components 27A and 28A may be identical.

Consistent with FIGS. 11A-11E, a protective housing kit can include baseplate 10, lid 60, a first shaped pin 77, and a second shaped pin 78. Thus, during installation of protective housing 1, the user can elect to assemble first shaped hinge 27 and discard second shaped pin 78, as in FIGS. 11B and 11D; or elect to assemble second shaped hinge 28 and discard first shaped pin 77, as in FIGS. 11C and 11E.

Various combinations of the above described hinge configurations can also be used. That is, first and second pins can differ based on one or more structural features, including one or more of different lengths, different diameters, and differently shaped heads; baseplate and lid hinge components would correspond to such structural feature(s).

Further, the configurations depicted in FIGS. 8A-11E depict lid hinge component parts (e.g., 63, 64, 61A, 62A, 65, 66) surrounding to each baseplate hinge component (e.g., 23, 24, 21A, 22A, 27A, 28A) (or parts thereof) along assembled hinges (or sub-hinges). However, it is contemplated that the configurations of lid hinge component parts and baseplate component parts can be reversed such that each lid hinge component (or part thereof) would be surrounded by corresponding baseplate component parts along assembled hinges (or sub-hinges). For example, In the case of a hinge configuration where the placement of the baseplate hinge component and the lid hinge component were reversed, the shaped head receiving portions 65A and 66A and would be included in first and second baseplate hinge components 27A and 28A instead of the lid hinge components 65 and 66.

Figure 12B:
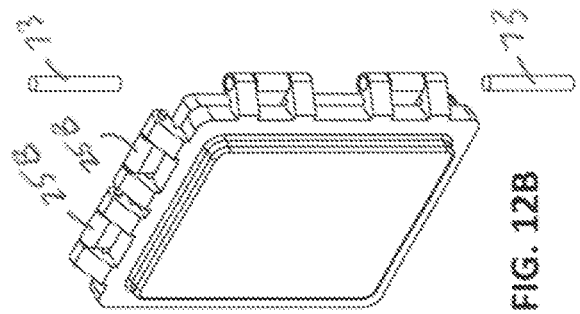
FIGS. 12A-12C illustrate another alternative baseplate and lid combination, including hinge assemblies.
Figure 12C:
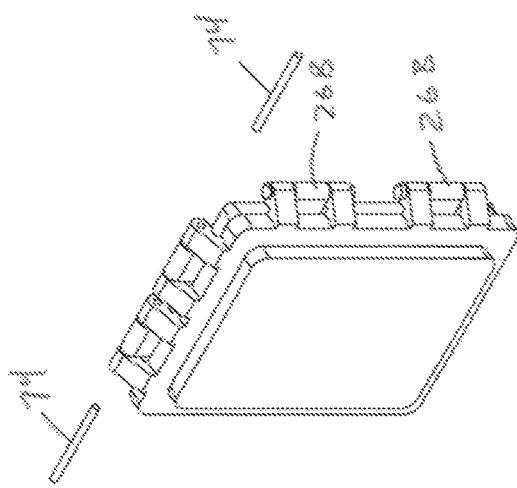
Figure 12A:
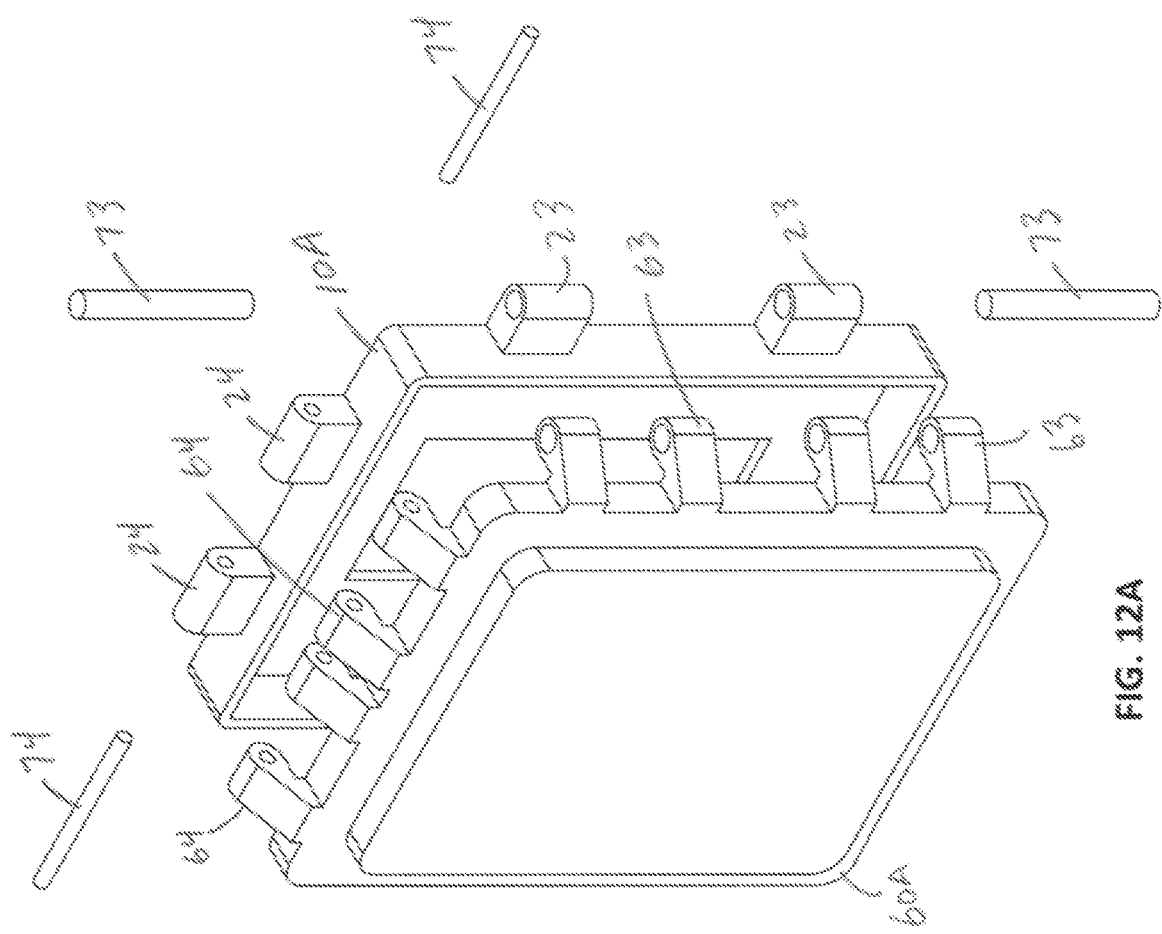

FIGS. 12A-12C depict a configuration similar to that shown in FIGS. 9A-9C, but includes baseplate with shorter walls 10A and a flatter lid 60A. In this embodiment, protective housing has a smaller profile and can be used where more inconspicuous protection of an electrical device is desired.

In order to provide a place for the electrical cords of a plugged-in electrical apparatus to exit a protective housing 1 installed on an electrical outlet while lid 60 remains closed, baseplate 10 can include one or more gaps 30 in walls 13 located opposite from baseplate flat portion 14. As depicted in FIGS. 1A-2C, protective housing 1 preferably includes two gaps 30, one on the wall portion opposite from vertical baseplate hinge component 21 and another on the wall portion opposite from horizontal baseplate hinge component 22. This configuration permits electrical cords to exit an installed protective housing 1 at a point closest to the ground, regardless of whether the protective housing is installed horizontally or vertically. The plug gap 30 that is not being use can be filled with plug 31, further protecting the electrical outlet from external elements, such as water, dirt, and debris. Or, if desired, both plug gaps 30 can be filled with plugs 31. Plugs 31 can be considered part of protective housing 1.

FIGS. 6A-6D provide views of plug 31. Plug 31 can be installed into plug gap 30 by sliding plug projections 34 into gap grooves 37 of gap 30 until plug snap element 32 engages with gap snap element 33 in gap 30. In one embodiment, plug 31 can be removed after its insertion by pressing on the side of plug 31 containing plug snap element 32 until gap snap element 33 is disengaged; then, plug 31 can be pulled from protective housing 1.

A protective housing 1 based on baseplate 10 illustrated in FIGS. 1A-2E, can protect electrical devices that are 1-gang in size. However, as discussed below, with respect to FIGS. 15A-20D, a multi-gang protective housing 101 can protect electrical devices that are 2-gang, 3-gang, 4-gang or more in size. Multi-gang protective housing 101 contains substantially the same elements as 1-gang protective housing 1, but can include multiple inserts 40 and/or larger inserts 140 to accommodate aperture 37 requirements of multi-gang electrical devices. The inserts and insert combination discussed below are exemplary and not limiting.

Figure 15A:
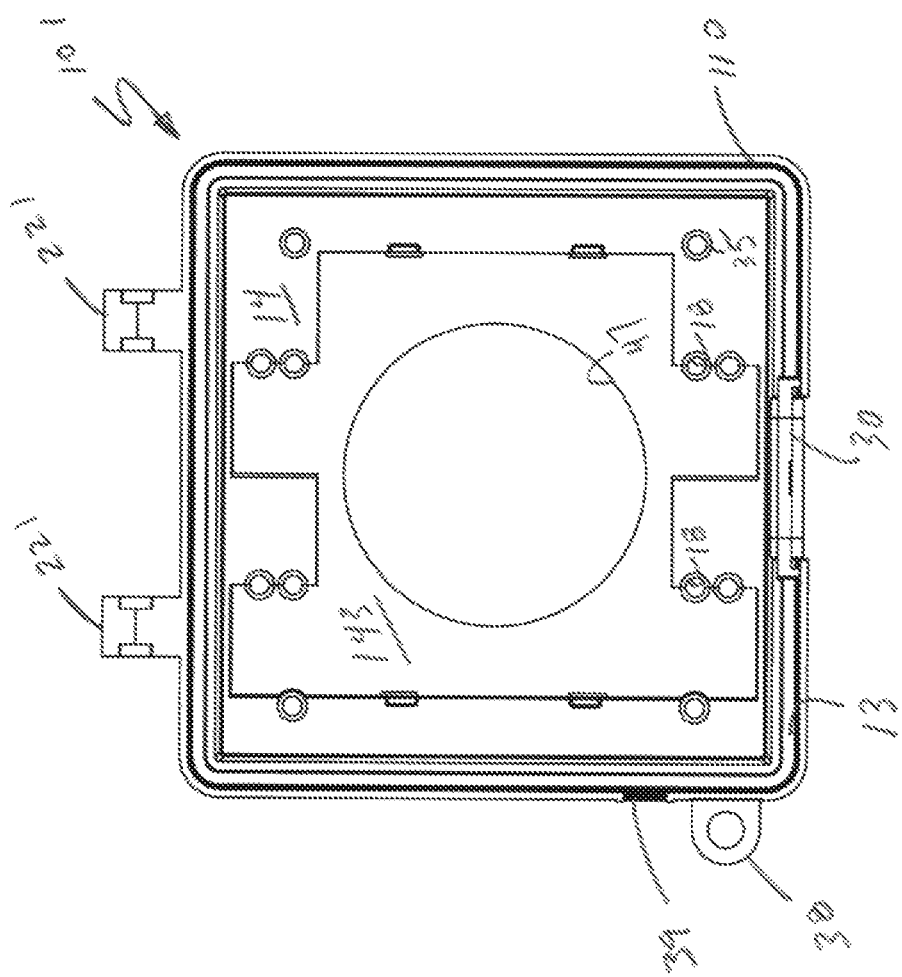
FIGS. 15A-15B are views of a protective housing with a 220V insert.
Figure 15B:
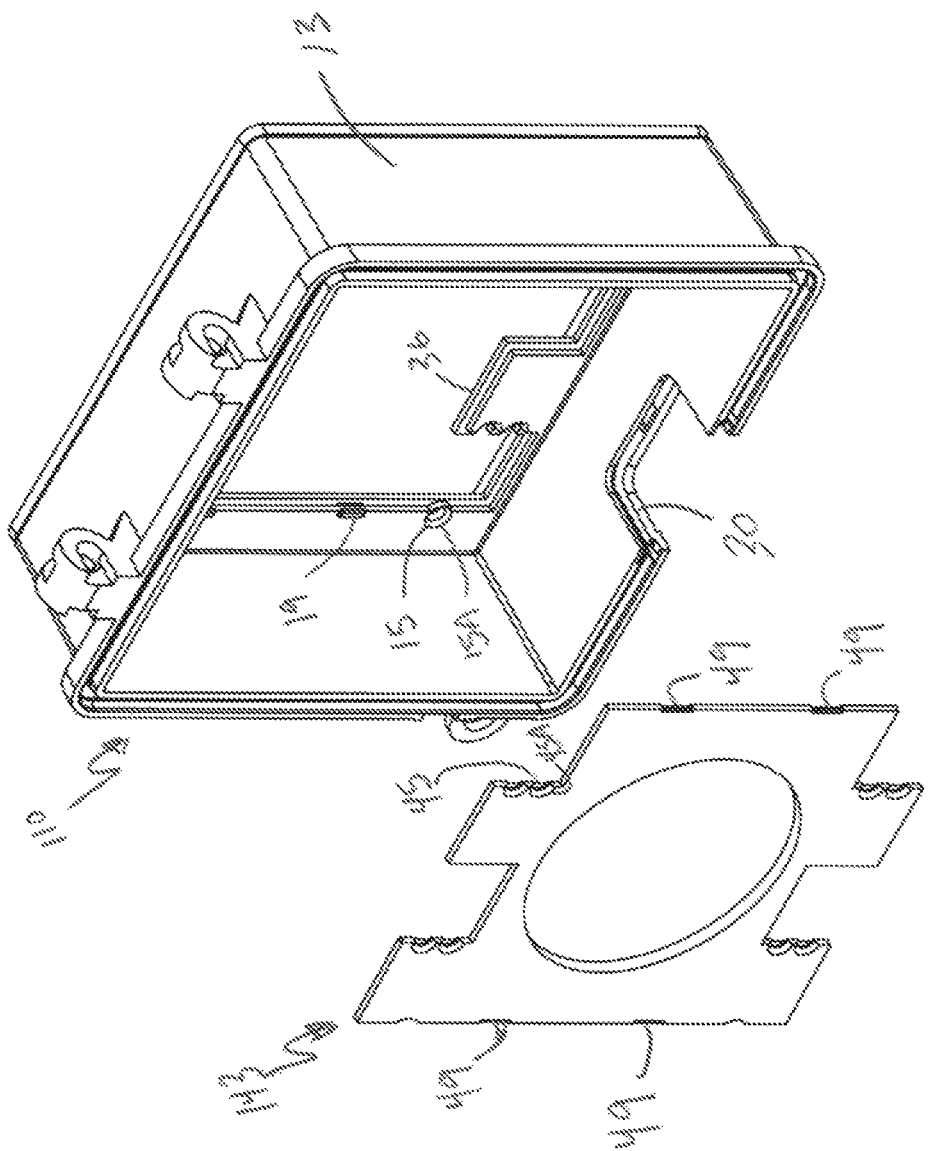

FIG. 15A depicts a 2-gang protective housing 101 including 2-gang baseplate 110 and 220V insert 143, which is a type of larger insert 140. FIG. 15B is an exploded view of the 2-gang protective housing of FIG. 15A. This embodiment of 2-gang protective housing 101 includes baseplate hinge components 221 only on a single side, and includes only a single gap 30 on the wall 13 opposite from hinge components 221. FIGS. 15C-15E provide top, front, and side views, respectively, of an alternative 220V insert 143. Each larger insert 140 can contain similar elements as insert 40, including, insert arcuate cutouts 45 and at least one aperture 47, as well as recessed areas 45A, insert snap elements 49, and stepped portion 46. Insert 140 can further include breakout lines 144. For example, as shown, 220V insert 143 can include breakout lines 144 to accommodate various sized 220V and/or RV-type electrical receptacles, including those with standard diameter sizes promulgated by the National Electrical Manufacturers Association (NEMA). To increase the size of the 220V receptacle aperture 47, portions of insert 143 internal to the respective break-out rings 144 can be removed prior to or during the process of installing protective housing 101.

Figure 16A:
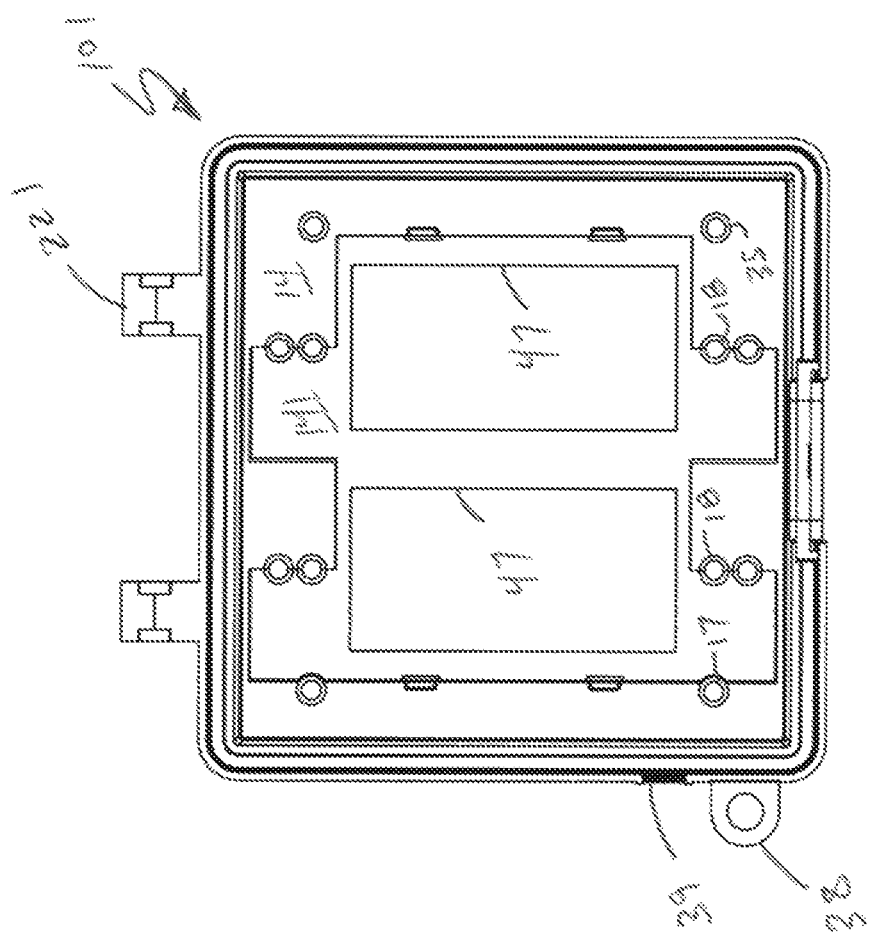
FIGS. 16A-16B are views of a protective housing with a double GFCI insert.
Figure 16B:
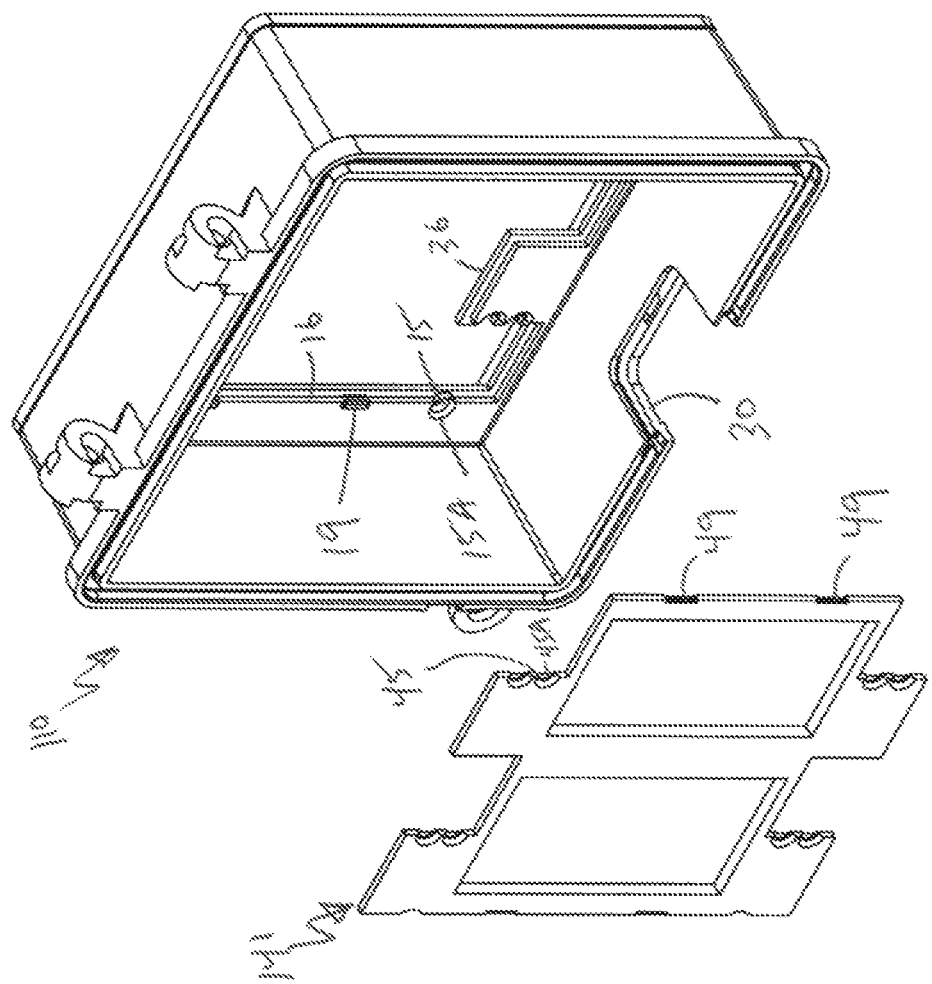

FIG. 16A depicts a 2-gang protective housing 101 including a 2-gang baseplate 110 and a double GFCI insert 141, which is a type of larger insert 140. Double GFCI insert 141 includes two GFCI apertures 47 for mounting on an electrical device comprising two adjacent GFCI outlets. FIG. 16B is an exploded view of the 2-gang protective housing of FIG. 16A.

Figure 17A:
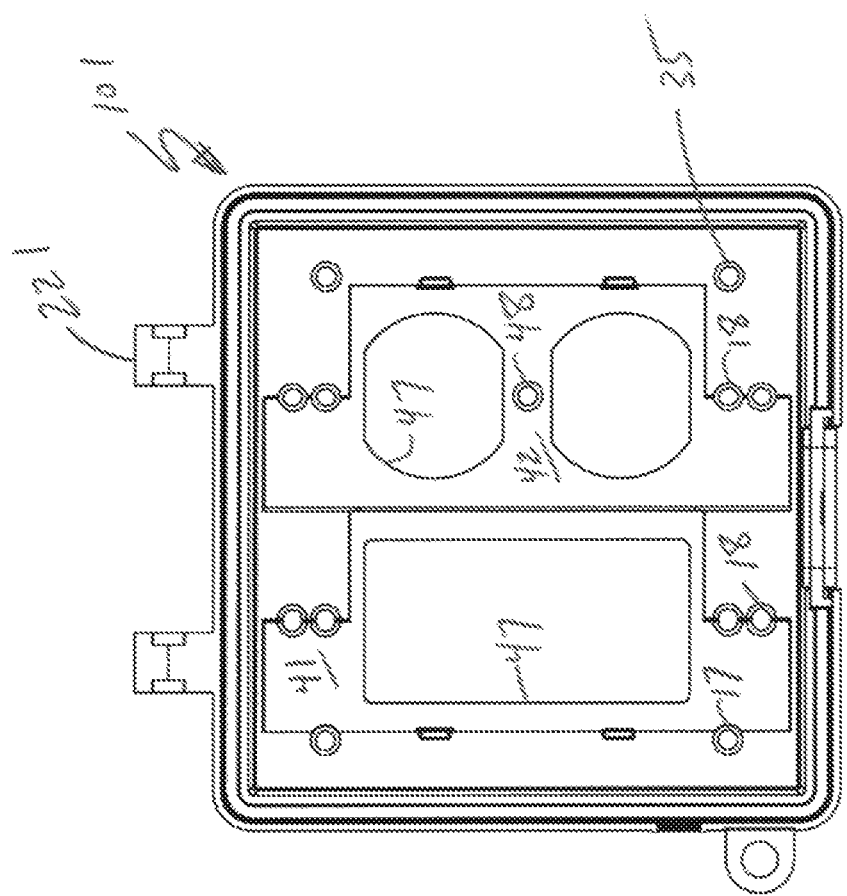
FIGS. 17A-17B are views of a protective housing with a GFCI insert and a duplex insert.
Figure 17B:
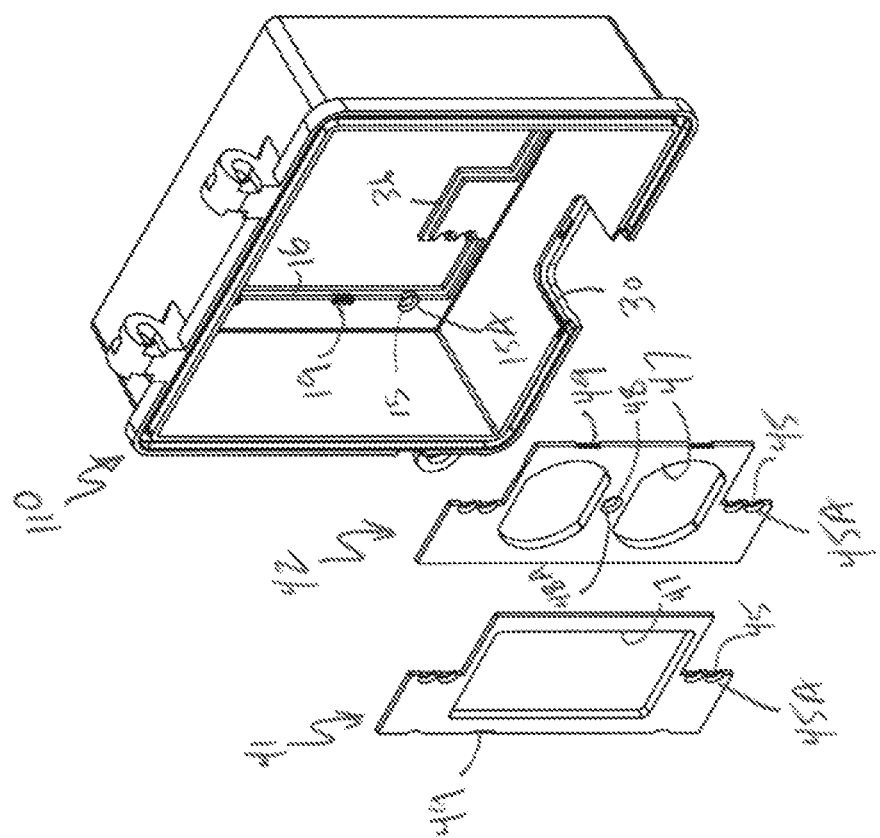
Figure 18A:
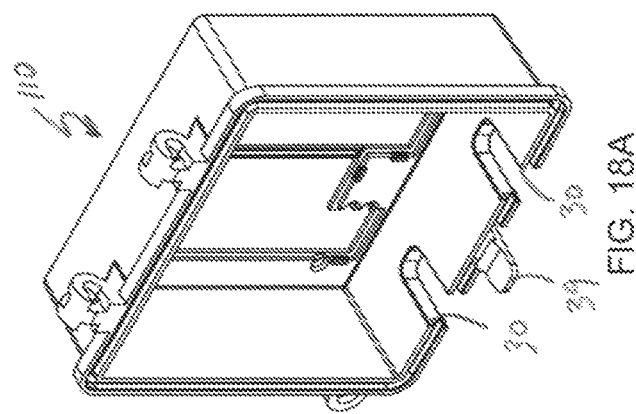
FIGS. 18A-18D are views of a 2-gang baseplate.
Figure 18B:
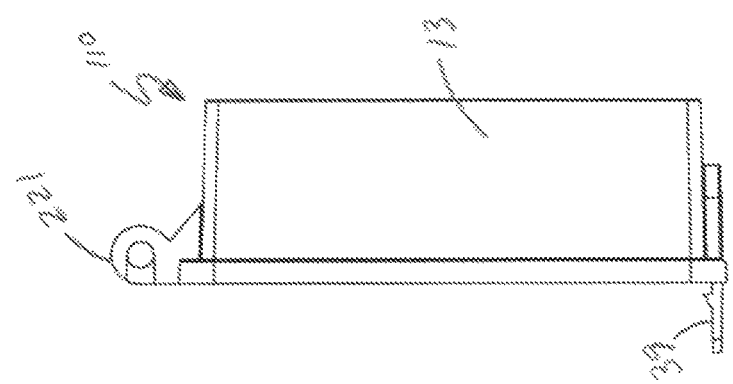
Figure 18C:
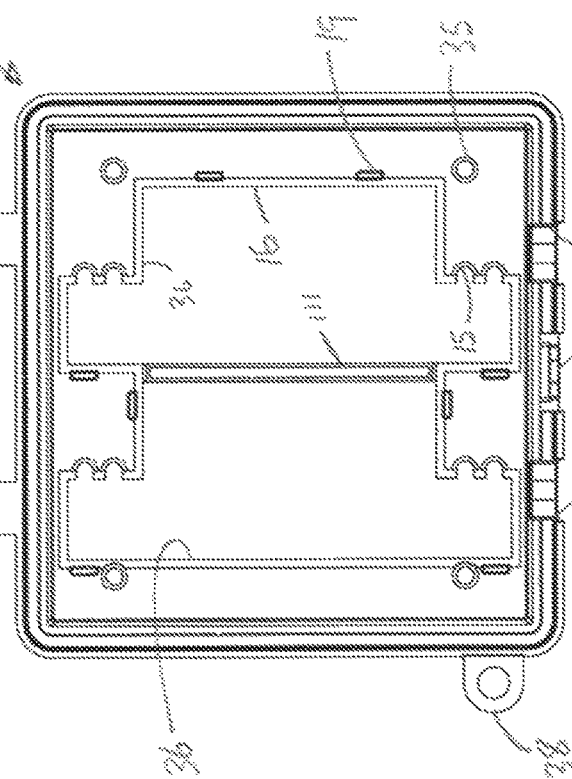
Figure 18D:
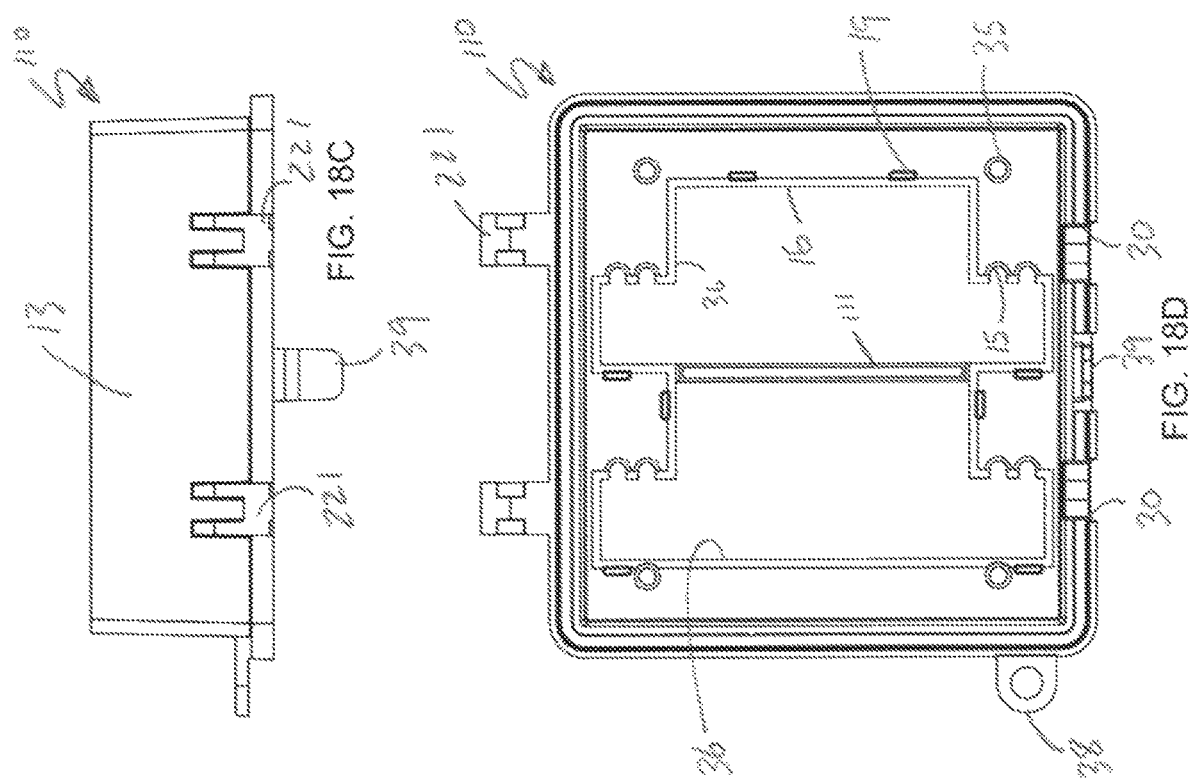

FIG. 17A depicts a 2-gang protective housing 101 including a 2-gang baseplate 110, a single GFCI insert 41, and a single duplex insert 42. Multi-gang baseplate 110 can fit multiple inserts 40 of the same or different types, which provides for flexibility when installing multi-gang protective housing 101 on a multi-gang electric device. As such, modular assembly of the protective housing is disclosed. By using different inserts 40, customized multi-gang protective housing 101 can easily be installed. The particular protective housing 101 depicted in FIG. 17A includes apertures 37 for mounting on an electrical device comprising a GFCI outlet adjacent to a duplex outlet. FIG. 17B is an exploded view of the 2-gang protective housing of FIG. 17A.

FIGS. 18A-18D provide perspective, top, hinge component side, and front views, respectively, of an alternative embodiment of 2-gang baseplate 110. In this embodiment, baseplate 110 includes two gaps 30 on the wall 13 opposite from the wall 13 portion with baseplate hinge components 221. Baseplate closure mechanism 39 is located on the same wall 13 portion between the gaps 30.

Baseplate bar 111 bisects internal opening 36. Preferably, the front surface of baseplate bar 111 is at approximately the same level as baseplate stepped portion 16. If, for example, two single inserts 40 are installed in this embodiment of 2-gang baseplate 110, one side of the stepped portion 46 of each of the inserts 40 can engage with baseplate bar 111. Thus, the baseplate bar 111 can support the inserts 40 in a manner similar to baseplate stepped portion 16, improve the seal between the inserts 40 and baseplate 110, and ease installation, Baseplate bar 111 can also be removable such that a user can pop it out during installation if, for example, a 220V insert 143 is to be installed in protective housing 101.

Figure 19A:
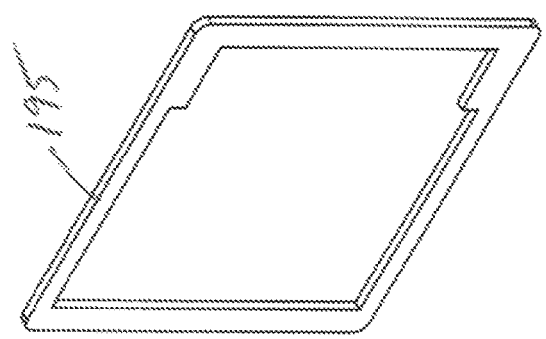
FIGS. 19A-19C are views of a 2-gang gasket.
Figure 19B:
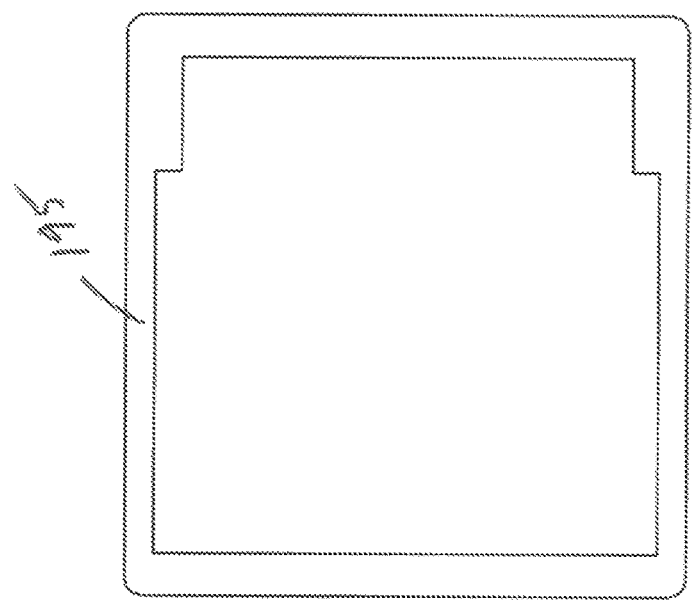
Figure 19C:
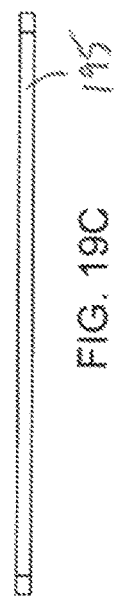
Figure 20A:
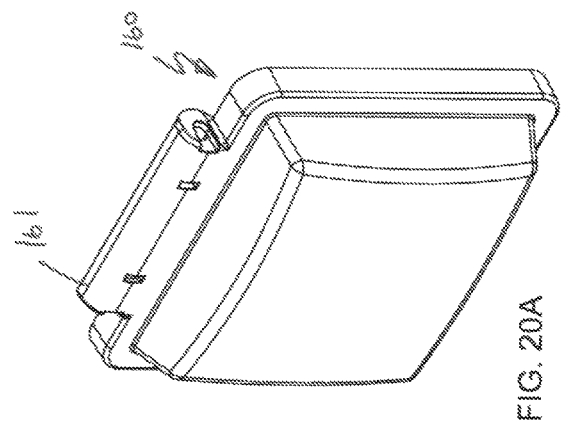
FIGS. 20A-20D are views of a 2-gang lid.
Figure 20B:
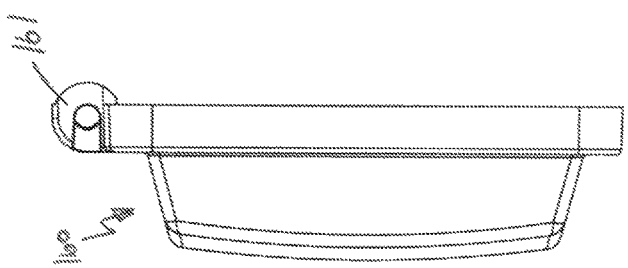
Figure 20C:
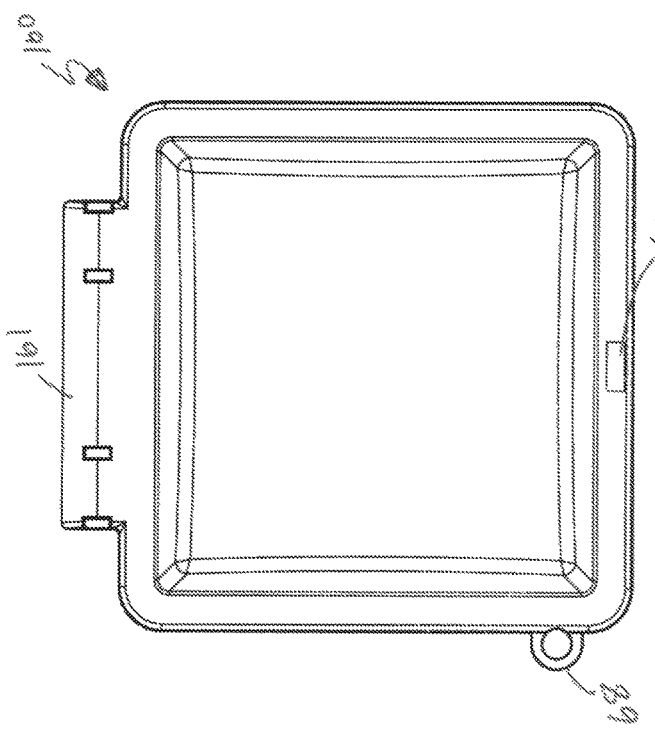
Figure 20D:
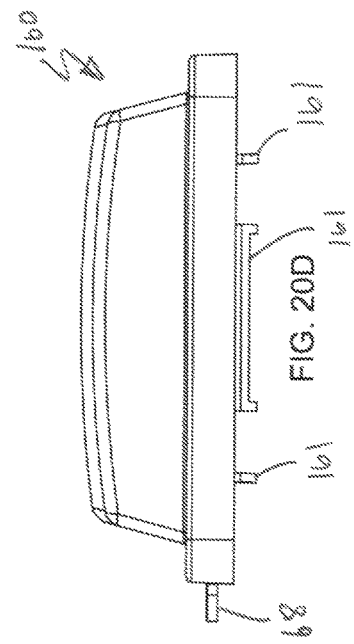

FIGS. 19A-19C illustrate perspective, front, and vertical side views, respectively, of an exemplary 2-gang gasket 195. Similar to gasket 95, gasket 195 can be positioned against or adhered to a gasket-receiving surface on backside of baseplate 110, to create or improve the seal between the baseplate 110 and a wall or structure surrounding the electrical device when protective housing 101 is installed.

FIGS. 20A-20D provide perspective, top, front, and hinge component side views, respectively, of 2-gang lid 160. 2-gang lid 160 contains substantially the same elements as lid 60, but is configured to correspond with 2-gang baseplate 110, as depicted in FIGS. 18A-18D, instead of baseplate 10. The depicted embodiment of 2-gang lid 160 includes only a single baseplate hinge component 161, but additional baseplate hinge components can be included. A multi-gang lid 160 may be rotatably connected to a multi-gang baseplate 110 through the various hinge assemblies discussed herein or in any other way known in the art.

Figure 14:
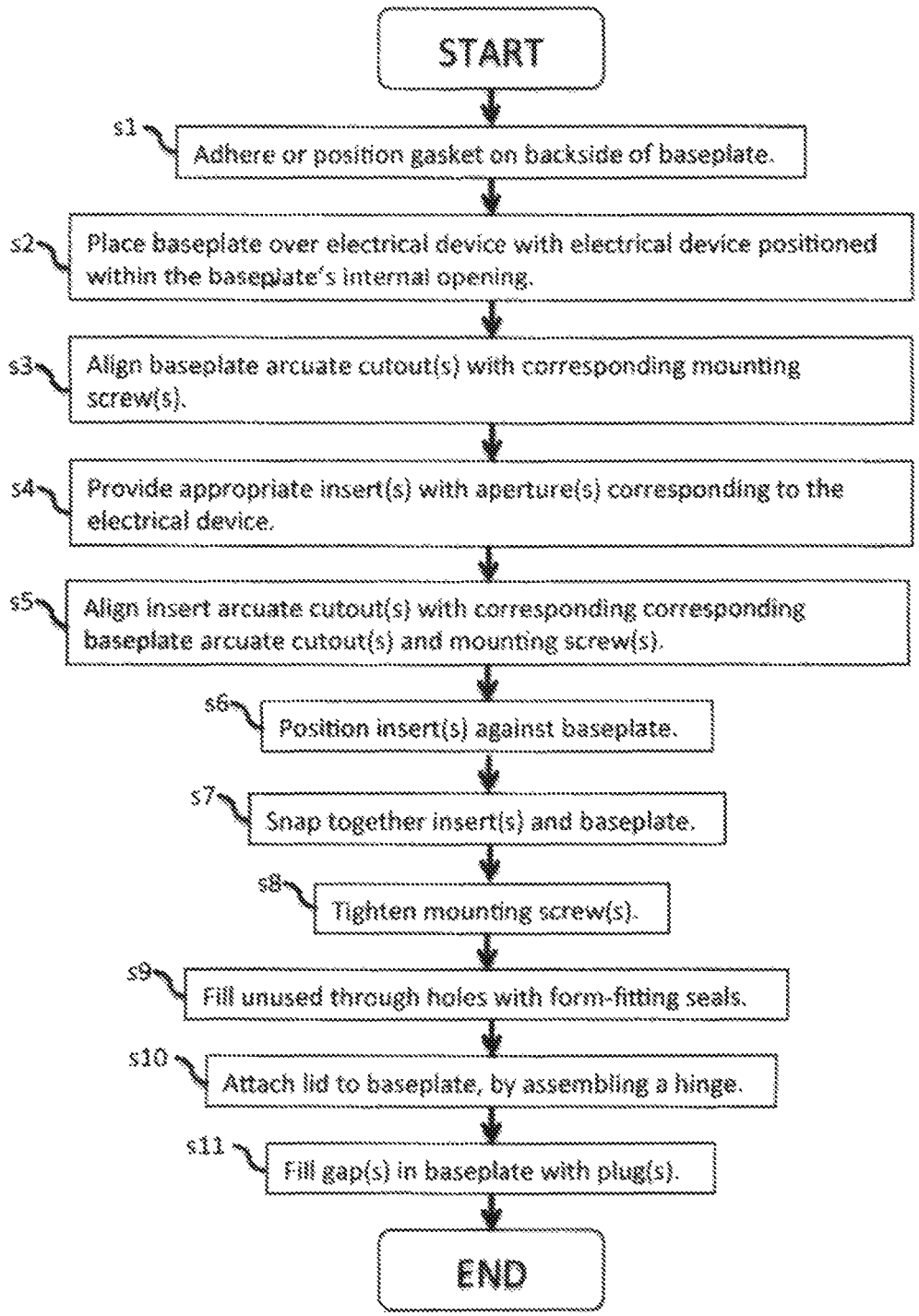
FIG. 14 is a flow chart of a method of installing a protective housing including a lid.

FIG. 14 is a flow chart providing an exemplary method of installing protective housing 1 or 101 on an electrical device. As in step S1, a gasket 95 or 195 may optionally be adhered to or positioned upon the gasket receiving surface 96 on backside of baseplate 10 or 110.

As in step S2, baseplate 10 or 110 may be placed over the electrical device, such that the electrical device is positioned within the internal opening 36 of baseplate 10 or 110. Prior to placing the baseplate 10 or 110 upon the electrical device, one or more mounting screws may already be inserted into the electrical device in order to affix the electrical device to a support structure and/or to ease installation of protective housing 1 or 101.

As in step S3, the already-inserted mounting screw(s) are aligned with corresponding baseplate arcuate cutout(s)15. Properly alignment of the baseplate arcuate cutout(s)15 with the already-inserted mounting screw(s) should ultimately result in a proper and aesthetically pleasing alignment of the baseplate 10 or 110 with the electrical device.

As in step S4, appropriate insert(s) 40 or 140 with an aperture(s) 47 corresponding to the electrical device are provided. Optionally, and if appropriate to form appropriately sized aperture(s) 47, portions of the insert(s) 40 or 140 can be removed along break out lines 144.

As in step S5, insert arcuate cutout(s) 45 are aligned with the baseplate arcuate cutout(s) 15 and the mounting screw(s). In this manner, baseplate arcuate cutout(s) 15 and insert arcuate cutout(s) 45 form a through hole around the already-inserted mounting screw(s). The arcuate cutouts 14 and 45 allow the protective housing to be assembled upon an electrical device with partially inserted mounting screws, obviating the need for a user to remove the mounting screws before installation, even if the screw heads are larger than anticipated. This improves both the speed and ease of installation—as well as any subsequent removal of the protective housing.

If included in insert(s) 40 or 140, a handle 50 can be beneficially used to manipulate the insert(s) in order to place insert arcuate cutout(s) 45 into the appropriate position(s). Preferably, if baseplate flat portion 14 includes shelf-type snap elements 19 on the same side of internal opening 36 as the baseplate arcuate cutout(s) 15 aligned with the mounting screw(s), insert snap elements 49 can be preliminarily engaged with the baseplate shelf-type snap elements 19 during this step.

As in step S6, insert(s) 40 or 140 are positioned against the baseplate 10 or 110. Insert(s) 40 or 140 are fitted within internal opening 36 of the baseplate 10, and aperture(s) 47 are fitted around the appropriate portions of the electrical device. If included in insert 40, handle 50 can be beneficially used to appropriately position the insert(s) 40 or 140. Where the perimeter of baseplate internal opening 36 includes baseplate stepped portion 16 and the external perimeter of insert 40 includes insert stepped portion 46, the respective stepped portions 16 and 46 are mated together, assuring rigid alignment and improving the seal between the baseplate 10 or 110 and insert(s) 40 or 140.

As in step S7, where appropriate, corresponding baseplate snap element(s) 19 and insert snap elements(s) 49 are snapped to each other, thereby attaching insert(s) 40 or 140 and baseplate 10 or 110.

As in step S8, the mounting screw(s) are tightened. Additional mounting screws can be inserted into other through holes of protective housing 1 and into the electrical device, and tightened. Tightening the mounting screws compresses the protective housing 1 or 101 against the electrical device, and, where a gasket 95 or 195 is provided, compresses the gasket between the protective housing and the wall or structure upon which electrical device is mounted, to create a watertight seal. The integrity of the gasket is ensured because the gasket is attached via compression and without potentially abrasive lateral sliding against the wall or structure. Further, if stepped portions 16 and 46 are included in the baseplate 10 or 110 and insert(s) 40 or 140, respectively, tightening certain mounting screw(s) compresses the baseplate 10 against the insert 10, improving the seal and connection between the components. Where a through hole includes recessed portion, a mounting screw can be tightened until the head of the mounting screw is tightly pressed against the recessed portion. It may be noted that mounting screws are not limited to any particular type of screw, but rather will be understood to include various types of attachments known in the art.

As in step S9, any through holes not occupied by a mounting screw can be filled with a form-fitting seal 91. To install seal 91, rim 93 is positioned on top of the through hole and pressure is placed on rim 94 until rim 93 is pushed through the through hole to the back the protective housing and shaft 92 fills the through hole. The rim 94 will remain on the front side of the protective housing, preferable in a recessed portion of the through hole.

As in step S10, a lid 60 or 160 can be attached to baseplate 10 or 110. Where applicable, an appropriate protective housing side for the hinge 20 may be selected. Then, hinge 40 may be assembled by inserting appropriate hinge pin(s) 70 into the corresponding baseplate and lid hinge components. Alternatively, the baseplate 10 or 110 and lid 60 or 160 can be attached by assembling hinge 40 prior to step S2.

As in step S11, if desired and appropriate, gap(s) 30 can be filled with plug(s) 31.

Other implementations will be apparent to those skilled in the art from consideration of the specification and practice of the disclosure. The various elements of the protective housing 1 disclosed herein can be composed of metal and or plastic and can be manufactured by any chosen method, including, for example, injection molding, die casting, stamping, extrusion, and/or machining. It is intended that the specification and examples be considered as exemplary only, with a true scope and spirit of the invention being indicated by the following claims.

What is claimed is:

1. A protective housing for an electrical device comprising:
   a baseplate including a first internal opening and first semi-circular cutout along the first internal opening; and
   a first insert with a second semi-circular cutout, wherein:
      the first insert fits within the first internal opening and the first and second semi-circular cutouts form a first circular through hole when the first insert is fitted within the first internal opening, and
      the first circular through hole is not a keyhole.

2. The protective housing of claim 1 wherein:
   the baseplate further comprises a first stepped portion on substantially all perimeter edges of the first internal opening;
   the first insert comprises a second stepped portion on substantially all outer perimeter edges; and
   the first stepped portion is configured to engage with the second stepped portion.

3. The protective housing of claim 1, wherein baseplate further comprises walls on a baseplate outer perimeter and a hinge element on the walls.

4. The protective housing of claim 3, wherein the walls further comprise at least one gap, the at least one gap configured to receive a plug.

5. The protective housing of claim 1, wherein:
   the baseplate includes a third semi-circular cutout along the first internal opening;
   the first insert includes a fourth semi-circular cutout; and
   the third and fourth semi-circular cutouts form a second circular through hole when the first insert is fitted within the first internal opening; and
   the second circular through hole is not a keyhole.

6. The protective housing of claim 1, further comprising:
   a second insert with at least one aperture, wherein:
      the baseplate includes second internal opening; and
      the second insert fits within the second internal opening.

7. The protective housing of claim 6, further comprising a baseplate bar,
   wherein the baseplate bar separates the first opening and the second opening.

8. The protective housing of claim 6, wherein the at least one aperture is sized to fit around the electrical device.

9. The protective housing of claim 6 wherein:
   the baseplate further comprises a first stepped portion on substantially all perimeter edges of the first internal opening; and
   the first insert comprises a second stepped portion on substantially all outer perimeter edges; and
   the first stepped portion is configured to engage with the second stepped portion.

10. The protective housing of claim 9 wherein:
    the baseplate further comprises a third stepped portion on substantially all perimeter edges of the second internal opening;
    the second insert comprises a fourth stepped portion on substantially all outer perimeter edges; and
    the third stepped portion is configured to engage with the fourth stepped portion.

11. The protective housing of claim 6, wherein baseplate further comprises walls on a baseplate outer perimeter and a hinge element on the walls.

12. The protective housing of claim 11, wherein the walls further comprise at least one gap, the at least one gap configured to receive a plug.

13. The protective housing of claim 6, wherein:
    the baseplate includes a third semi-circular cutout along the first internal opening;
    the first insert includes a fourth semi-circular cutout; and
    the third and fourth semi-circular cutouts form a second circular through hole when the first insert is fitted within the first internal opening; and
    the second circular through hole is not a keyhole.

14. The protective housing of claim 1, further comprising:
    a second insert with a fourth semi-circular cutout, wherein:
       the baseplate includes a second internal opening and third semi-circular cutout along the second internal opening; and
       the second insert fits within the second internal opening and the third and fourth semi-circular cutouts form a second circular through hole when the second insert is fitted within the second internal opening; and
       wherein the second circular through hole is not a keyhole.

15. The protective housing of claim 14, wherein:
    the baseplate includes a fifth semi-circular cutout along the first internal opening;
    the first insert includes a sixth semi-circular cutout;
    the fifth and sixth semi-circular cutouts form a third circular through hole when the first insert is fitted within the first internal opening;
    the third circular through hole is not a keyhole;
    the baseplate includes a seventh semi-circular cutout along the second internal opening;
    the second insert includes a eighth semi-circular cutout;
    the seventh and eighth semi-circular cutouts form a fourth circular through hole when the second insert is fitted within the second internal opening; and
    the fourth circular through hole is not a keyhole.

16. The protective housing of claim 14 wherein:
    the baseplate further comprises a first stepped portion on substantially all perimeter edges of the first internal opening; and the first insert comprises a second stepped portion on substantially all outer perimeter edges; and the first stepped portion is configured to engage with the second stepped portion.

17. The protective housing of claim 16 wherein:

the baseplate further comprises a third stepped portion on substantially all perimeter edges of the second internal opening;

the second insert comprises a fourth stepped portion on substantially all outer perimeter edges; and the third stepped portion is configured to engage with the fourth stepped portion.

18. The protective housing of claim 14, wherein baseplate further comprises walls on a baseplate outer perimeter and a hinge element on the walls.

19. The protective housing of claim 18 wherein the walls further comprise at least one gap, the at least one gap configured to receive a plug.

20. The protective housing of claim 1, wherein the protective housing does not include any keyholes.

* * * * *